(12) United States Patent
Anzawa et al.

(10) Patent No.: US 8,441,557 B2
(45) Date of Patent: May 14, 2013

(54) ZOOM LENS AND IMAGING DEVICE

(75) Inventors: Takuya Anzawa, Kanagawa (JP); Shinichi Arita, Tokyo (JP)

(73) Assignee: Sony Corporation, Tokyo (JP)

( * ) Notice: Subject to any disclaimer, the term of this patent is extended or adjusted under 35 U.S.C. 154(b) by 54 days.

(21) Appl. No.: 13/317,021

(22) Filed: Oct. 7, 2011

(65) Prior Publication Data

US 2012/0147253 A1 Jun. 14, 2012

(30) Foreign Application Priority Data

Dec. 14, 2010 (JP) ................................. 2010-278529

(51) Int. Cl.
*H04N 5/262* (2006.01)
*G02B 15/14* (2006.01)

(52) U.S. Cl.
USPC ....................................... 348/240.3; 359/683

(58) Field of Classification Search ............. 348/208.11, 348/208.13, 240.3; 359/557, 683, 684, 686, 359/687

See application file for complete search history.

(56) References Cited

U.S. PATENT DOCUMENTS

| | | | | |
|---|---|---|---|---|
| 6,342,973 | B1 * | 1/2002 | Kikuchi et al. | 359/687 |
| 7,525,729 | B2 * | 4/2009 | Suzaki et al. | 359/557 |
| 7,542,212 | B2 * | 6/2009 | Toyoda et al. | 359/676 |
| 7,551,366 | B2 * | 6/2009 | Suzaki et al. | 359/687 |
| 7,609,460 | B2 * | 10/2009 | Suzaki et al. | 359/764 |
| 7,706,080 | B2 * | 4/2010 | Ohtake et al. | 359/687 |
| 8,154,801 | B2 * | 4/2012 | Suzaki et al. | 359/557 |

FOREIGN PATENT DOCUMENTS

JP 4007258 11/2007

* cited by examiner

*Primary Examiner* — David N Spector
(74) *Attorney, Agent, or Firm* — Rader, Fishman & Grauer PLLC

(57) ABSTRACT

A zoom lens includes a first lens group with positive refracting power and normally located at a fixed position, a second lens group with negative refracting power and movable in an optical axis direction for zooming, a third lens group with positive refracting power and normally located at a fixed position, a fourth lens group with positive refracting power and movable in the optical axis direction for correction of a focal position for zooming and focusing, and a fifth lens group. These lens groups are arranged in order from an object side to an image side. The zoom lens satisfies the conditional equations (1) $1.00 < f3/f4 < 2.49$ and (2) $1.00 < |fw1 \sim 2/f2| < 1.50$, where $f2$ to $f4$ are focal lengths of the second to fourth lens groups, and $fw1 \sim 2$ is a synthetic focal length of the first and second lens groups at the wide-angle end.

11 Claims, 17 Drawing Sheets

ZOOM LENS AND IMAGING DEVICE

BACKGROUND

The present disclosure relates to a zoom lens and an imaging apparatus. More particularly, the present disclosure relates to a zoom lens which has a high zoom ratio of about thirty times to fifty times and achieves a wide angle of view which is a half angle of view of 29 or more degrees at a wide-angle end and miniaturization, and an imaging apparatus having the zoom lens.

In recent years, small-sized imaging apparatuses such as video cameras or digital still cameras for consumer use have also become widespread for household use. In relation to the small-sized imaging apparatuses, along with the miniaturization of an imaging device such as a CCD (Charge Coupled Device) or a CMOS (Complementary Metal Oxide Semiconductor), there has been demand for a wide angle zoom lens of which the overall lens system has a small size, high zoom ratio, and high performance.

However, if a high zoom ratio is to be realized in the wide angle zoom lens, the diameters of lenses of a first lens group tend to increase, and since there is strong demand for aberration correction there is a problem in that more lenses are necessary, which causes difficulty in achieving a small size and light weight.

In relation to the demand, there has been proposed a zoom lens in which a high zoom ratio is achieved and then miniaturization is attempted in a four-group inner focus type having positive, negative, positive, and positive refracting power (for example, refer to Japanese Patent No. 4007258).

SUMMARY

However, in the zoom lens disclosed in Japanese Patent No. 4007258, a high zoom ratio and miniaturization are attempted to be achieved in the four-group configuration, but widening an angle for achieving a half angle of view of 29 degrees or more at the wide-angle end has not been attempted.

It is desirable to provide a zoom lens and an imaging apparatus, capable achieving a high zoom ratio, miniaturization, and a wide angle.

According to an embodiment of the present disclosure, there is provided a zoom lens including a first lens group that has positive refracting power and is normally located at a fixed position, a second lens group that has negative refracting power and is movable in an optical axis direction for zooming, a third lens group that has positive refracting power and is normally located at a fixed position, a fourth lens group that has positive refracting power and is movable in the optical axis direction for correction of a focal position due to the zooming and for focusing, and a fifth lens group, arranged in order from an object side to an image side, wherein the zoom lens satisfies the conditional equations (1) $1.00<f3/f4<2.49$ and (2) $1.00<|fw1\sim2/f2|<1.50$, where f2 is a focal length of the second lens group, f3 is a focal length of the third lens group, f4 is a focal length of the fourth lens group, and $fw1\sim2$ is a synthetic focal length of the first lens group and the second lens group at the wide-angle end.

Therefore, in the zoom, lens, a ratio of the refracting power of the third lens group and the refracting power of the fourth lens group is optimized, and a spherical aberration and an axial chromatic aberration generated in the first lens group are favorably corrected at the telephoto end when a high zoom ratio is attempted to be realized.

In the zoom lens, preferably, the fifth lens group has a movable group that is movable in a direction perpendicular to the optical axis, and an image formed on an image surface can be moved in the direction perpendicular to the optical axis by moving the movable group in the direction perpendicular to the optical axis, and the zoom lens satisfies the conditional equation (3) $1.50<|f1\times f5m|/100<3.20$, where f1 is a focal length of the first lens group, and f5m is a focal length of the movable group in the fifth lens group.

The zoom lens is configured as described above in order to satisfy the conditional equation (3), and thereby an increase in the refracting power of the first lens group is suppressed.

In the zoom lens, preferably, the fifth lens group includes the movable group that has negative refracting power and a fixed group that has positive refracting power and is normally located at a fixed position, arranged in order from the object side to the image side, and the zoom lens satisfies the conditional equations (4) $0.5<(|f5\ m|-5.2)/1.66<6.0$ and (5) $0.8<ft1\sim2/|f5m\times\phi|<3.1$, where $ft1\sim2$ is a synthetic focal length of the first lens group and the second lens group at the telephoto end, and $\phi$ is an effective diameter of a lens closest to the object side in the first lens group.

The zoom lens is configured as described above so as to satisfy the conditional equations (4) and (5). Thereby, a field curvature of peripheral light beams is favorably corrected, and sensitivity of the movable lens group is reduced, and a movement amount of the movable lens group is reduced.

In the zoom lens, preferably, the fifth lens group includes a fixed group that has negative refracting power and is normally located at a fixed position, and the movable group that has positive refracting power, arranged in order from the object side to the image side, and the zoom lens satisfies the conditional equations (4) $0.5<(|f5m|-5.2)/1.66<6.0$ and (5) $0.8<ft1\sim2/|f5m\times\phi|<3.1$, where $ft1\sim2$ is a synthetic focal length of the first lens group and the second lens group at the telephoto end, and $\phi$ is an effective diameter of a lens closest to the object side in the first lens group.

The zoom lens is configured as described above so as to satisfy the conditional equations (4) and (5). Thereby, a field curvature of peripheral light beams is favorably corrected, and sensitivity of the movable lens group is reduced, and a movement amount of the movable lens group is reduced.

In the zoom lens, at least one face in the second lens group is preferably an aspherical surface.

At least one face in the second lens group is an aspherical surface, and thus all the aberrations are favorably corrected by the aspherical surface.

In the zoom lens, at least one face in the third lens group is preferably an aspherical surface.

At least one face in the third lens group is an aspherical surface, and thus all the aberrations are favorably corrected by the aspherical surface.

In the zoom lens, at least one face in the fourth lens group is preferably an aspherical surface.

At least one face in the fourth lens group is an aspherical surface, and thus all the aberrations are favorably corrected by the aspherical surface.

In the zoom lens, at least one face in the fifth lens group is preferably an aspherical surface.

At least one face in the fifth lens group is an aspherical surface, and thus all the aberrations are favorably corrected by the aspherical surface.

According to another embodiment of the present disclosure, there is provided an imaging apparatus having a zoom lens; and an imaging device that converts an optical image formed by the zoom lens into an electric signal, wherein the zoom lens includes a first lens group that has positive refracting power and is normally located at a fixed position, a second lens group that has negative refracting power and is movable in an optical axis direction for zooming, a third lens group that has positive refracting power and is normally located at a fixed position, a fourth lens group that has positive refracting power and is movable in the optical axis direction for correction of a focal position due to the zooming and for focusing, and a fifth lens group, arranged in order from an object side to an image side, wherein the zoom lens satisfies the conditional equations (1) $1.00<f3/f4<2.49$ and (2) $1.00<|fw1{\sim}2/f2|<1.50$, where f2 is a focal length of the second lens group, f3 is a focal length of the third lens group, f4 is a focal length of the fourth lens group, and fw1~2 is a synthetic focal length of the first lens group and the second lens group at the wide-angle end.

Therefore, in the imaging apparatus, a ratio of the refracting power of the third lens group and the refracting power of the fourth lens group is optimized, and a spherical aberration and an axial chromatic aberration generated in the first lens group are favorably corrected at the telephoto end when a high zoom ratio is attempted to be realized.

According to still another embodiment of the present disclosure, there is provided a zoom lens including a first lens group that has positive refracting power and is normally located at a fixed position, a second lens group that has negative refracting power and is movable in an optical axis direction for zooming, a third lens group that has positive refracting power and is normally located at a fixed position, and a fourth lens group that has positive refracting power and is movable in the optical axis direction for correction of a focal position due to the zooming and for focusing, arranged in order from an object side to an image side, wherein the zoom lens satisfies the conditional equations (1) $1.00<f3/f4<2.49$ and (2) $1.00<|fw1{\sim}2/f2|<1.50$, where f2 is a focal length of the second lens group, f3 is a focal length of the third lens group, f4 is a focal length of the fourth lens group, and fw1~2 is a synthetic focal length of the first lens group and the second lens group at the wide-angle end.

Therefore, in the zoom lens according to the embodiment, the ratio of the refracting power of the third lens group and the refracting power of the fourth lens group is optimized, and a spherical aberration and an axial chromatic aberration generated in the first lens group are favorably corrected at the telephoto end when a high zoom ratio is attempted to be realized.

According to still another embodiment of the present disclosure, there is provided an imaging apparatus having a zoom lens; and an imaging device that converts an optical image formed by the zoom lens into an electric signal, wherein the zoom lens includes a first lens group that has positive refracting power and is normally located at a fixed position, a second lens group that has negative refracting power and is movable in an optical axis direction for zooming, a third lens group that has positive refracting power and is normally located at a fixed position, and a fourth lens group that has positive refracting power and is movable in the optical axis direction for correction of a focal position due to the zooming and for focusing, arranged in order from an object side to an image side, wherein the zoom lens satisfies the conditional equations (1) $1.00<f3/f4<2.49$ and (2) $1.00<|fw1{\sim}2/f2|<1.50$, where f2 is a focal length of the second lens group, f3 is a focal length of the third lens group, f4 is a focal length of the fourth lens group, and fw1~2 is a synthetic focal length of the first lens group and the second lens group at the wide-angle end.

Therefore, in the imaging apparatus, a ratio of the refracting power of the third lens group and the refracting power of the fourth lens group is optimized, and a spherical aberration and an axial chromatic aberration generated in the first lens group are favorably corrected at the telephoto end when a high zoom ratio is attempted to be realized.

According to the embodiments of the present disclosure, it is possible to provide a zoom lens and an imaging apparatus, capable achieving a high zoom ratio, miniaturization, and a wide angle.

DETAILED DESCRIPTION OF EMBODIMENTS

Figure 1:
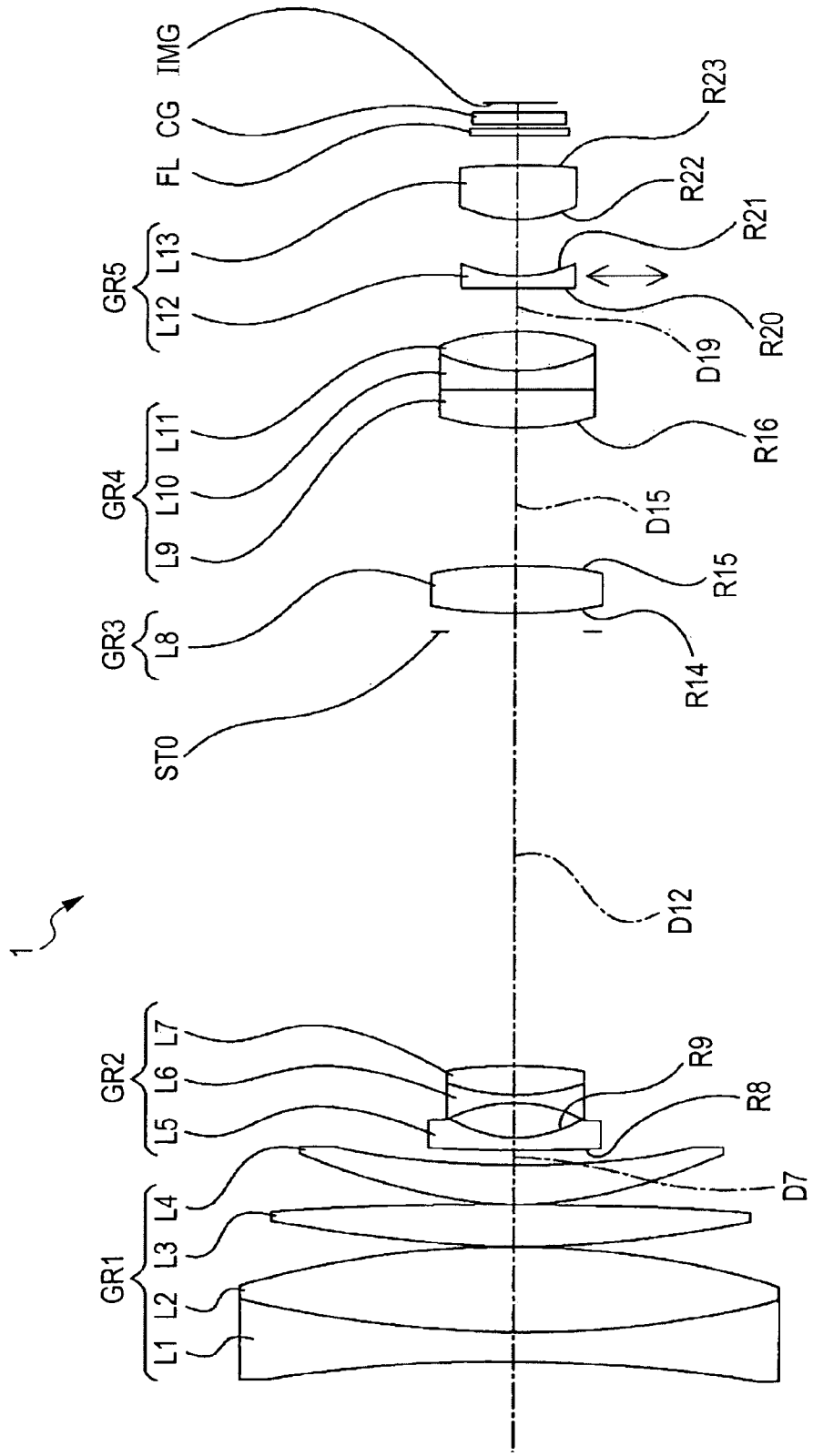
FIG. 1 is a diagram illustrating a lens configuration of a zoom lens according to a first embodiment.

Hereinafter, exemplary embodiments for implementing a zoom lens and an imaging apparatus will be described.

Configuration of Zoom Lens According to an Embodiment

A zoom lens according to an embodiment of the present disclosure includes a first lens group that has positive refracting power and is normally located at a fixed position, a second lens group that has negative refracting power and is movable in an optical axis direction for zooming, a third lens group that has positive refracting power and is normally located at a fixed position, a fourth lens group that has positive refracting power and is movable in the optical axis direction for correction of a focal position due to the zooming and for focusing, and a fifth lens group, arranged in order from an object side to an image side.

That is to say, in the zoom lens according to the embodiment of the present disclosure, the zoom lens has a five-group configuration of positive, negative, positive, positive and positive refracting power, or positive, negative, positive, positive and negative refracting power. The second lens group is moved in the optical axis direction for zooming, and the fourth lens group is moved in the optical axis direction for correction of a focal position due to zooming and for focusing.

The zoom lens according to the embodiment of the present disclosure satisfies the conditional equations (1) $1.00<f3/f4<2.49$ and the conditional equation (2) $1.00<|fw1\sim2/f2|<1.50$, where f2 is a focal length of the second lens group, f3 is a focal length of the third lens group, f4 is a focal length of the fourth lens group, and $fw1\sim2$ is a synthetic focal length of the first lens group and the second lens group at the wide-angle end.

The conditional equation (1) defines a ratio of the refracting power of the third lens group which has positive refracting power and is normally located at a fixed position, and the refracting power of the fourth lens group which has positive refracting power and is movable in the optical axis direction for correction of a focal position due to zooming and for focusing.

If a value is smaller than the lower limit value of the conditional equation (1), the refracting power of the third lens group becomes too intense or the refracting power of the fourth lens group becomes too weak. If the refracting power of the third lens group becomes too intense, a spherical aberration is insufficiently corrected at the wide-angle end, and correction due to variations in a spherical aberration is difficult during focusing. If the refracting power of the fourth lens group becomes too weak, a movement amount is increased during focusing, and thereby aberration variations such as a field curvature and a comma aberration are increased. In addition, a back focus is lengthened more than necessary, and thereby it is difficult to reduce the length of the overall optical system.

In contrast, if a value is greater than the upper limit value of the conditional equation (1), the refracting power of the third lens group becomes too weak, or the refracting power of the fourth lens group becomes too intense.

If the refracting power of the third lens group becomes too weak, a spherical aberration at the wide-angle end is excessively corrected. If the refracting power of the fourth lens group becomes too intense, a spherical aberration at the wide-angle end is insufficiently corrected.

Therefore, by the zoom lens satisfying the conditional equation (1), the imaging apparatus can favorably correct all the aberrations through the optimization of the ratio of the refracting power of the third lens group and the refracting power of the fourth lens group, and can achieve miniaturization through the reduction in the length of the overall optical system.

The conditional equation (2) defines a relationship between the focal length and wide angle performance of the second lens group.

If a value is smaller than the lower limit value of the conditional equation (2), the refracting power of the second lens group becomes too intense, and thus refracting power of the first is relatively increased when a high zoom ratio is to be realized. Thereby, it is difficult to suppress a spherical aberration and an axial chromatic aberration generated in the first lens group at the telephoto end.

In contrast, if a value is greater than the upper limit of the conditional equation (2), the refracting power of the second lens group is reduced, and thus intense refracting power of the second lens group which is necessary for a wide angle may not be secured. Thereby, a wide angle may not be achieved.

Therefore, by the zoom lens satisfying the conditional equation (2), the zoom lens can favorably correct a spherical aberration and an axial chromatic aberration generated in the first lens group when a high zoom ratio is attempted, and can achieve a wide angle by securing intense refracting power of the second lens group.

As described above, in the five-group configuration of positive, negative, positive, positive and positive refracting power, or positive, negative, positive, positive and negative refracting power, the zoom lens can achieve a high zoom ratio, miniaturization, and a wide angle by satisfying the conditional equations (1) and (2).

In addition, the range of the conditional equation (1) is more preferably $1.10<f3/f4<2.00$ in order to more favorably correct all the aberrations and thus to further reduce the length of the overall optical system.

In addition, the range of the conditional equation (2) is more preferably $1.10<|fw1\sim2/f2|<1.40$ in order to achieve a higher zoom ratio by more favorably correcting a spherical aberration and an axial chromatic aberration generated in the first lens group and to achieve a wider angle by securing more intense refracting power of the second lens group.

In the zoom lens according to the embodiment of the present disclosure, preferably, the fifth lens group has a movable group that is movable in a direction perpendicular to the optical axis, and an image formed on an image surface can be moved in the direction perpendicular to the optical axis by moving the movable group in the direction perpendicular to the optical axis. Here, the zoom lens satisfies the conditional equation (3) $1.50<|f1\times f5m|/100<3.20$, where f1 is a focal length of the first lens group, and f5m is a focal length of the movable group in the fifth lens group.

The fifth lens group is configured to have the movable group which is movable in the direction perpendicular to the optical axis. Thereby, the movable group functions as an anti-shake movable lens group (a shift lens group), and thus it is possible to perform blur correction by moving an image formed on the image surface in the direction perpendicular to the optical axis.

The conditional equation (3) defines wide angle performance, optical shake performance, and a size of a lens from the relationship between the first lens group and the fifth lens group.

If a value is smaller than the lower limit value of the conditional equation (3), magnification of the anti-shake movable lens group of the fifth lens group with respect to magnification of the overall lenses is reduced so as to increase a movement amount of the anti-shake movable lens group, thereby causing an increase in size in the diameter direction of the lens.

In contrast, if a value is greater than the upper limit value of the conditional equation (3), intense refracting power of the second lens group is necessary for a wide angle, and thus the refracting power of the first lens group is increased when a high zoom ratio is attempted to be realized. In addition, since magnification of the movable lens group of the fifth lens group is increased so as to match the reduction magnification of the overall lenses for effective camera shake correction, sensitivity of the movable lens group is increased and thus control accuracy of an optical stabilizer mechanism is reduced.

Therefore, by the zoom lens satisfying the conditional equation (3), a high zoom ratio can be achieved by suppressing an increase in the refracting power of the first lens group, and favorable control accuracy of the optical stabilizer mechanism can be secured by suppressing an increase in sensitivity of the movable lens group.

In addition, as zoom lenses in the related art, there is a zoom lens where the third lens group is a movable lens group which is movable in the direction perpendicular to the optical axis in order to correct image variations due to camera shake.

However, a diameter of light flux in the third lens group tends to be increased as compared with other lens groups except for the first lens group. Thus, if the third lens group is a movable lens group, an effective diameter on a lens surface becomes too large, and thereby miniaturization may not be achieved.

In addition, the third lens group is configured to be positioned substantially at the center in the optical axis direction, and to have intense refracting power. Therefore, when the third lens group is moved in the direction perpendicular to the optical axis, variations in light flux positions are increased in other lens groups, thus effective diameters on lens surfaces forming the other lens groups are also increased, and thereby miniaturization is difficult.

Therefore, as described above, the zoom lens has the fifth lens group provided with the movable lens group, and thereby a factor which hinders miniaturization when the third lens group is a movable lens group does not occur. In addition, the conditional equation (3) is satisfied, and thus it is possible to secure favorable control accuracy of the optical stabilizer mechanism, and to achieve miniaturization of the zoom lens.

In addition, in the five-group configuration of positive, negative, positive, positive and positive refracting power, or positive, negative, positive, positive and negative refracting power, the zoom lens is configured to provide the movable lens group in the fifth lens group so as to satisfy the conditional equations (1) to (3), thereby achieving a high zoom ratio, a wide angle, and miniaturization, and providing a zoom lens where all the aberrations other than a distortion aberration are favorably corrected.

In the zoom lens according to an embodiment of the present disclosure, preferably, the fifth lens group includes a movable group that has negative refracting power, and a fixed group that has positive refracting power and is normally located at a fixed position, arranged in order from the object side to the image side, and the zoom lens satisfies the conditional equations (4) $0.5<(|f5m|-5.2)/1.66<6.0$ and (5) $0.8<ft1\sim2/|f5m\times\phi|<3.1$, where $ft1\sim2$ is a synthetic focal length of the first lens group and the second lens group at the telephoto end, and $\phi$ is an effective diameter of a lens closest to the object side in the first lens group.

The conditional equation (4) defines a relationship between the movable lens group of the fifth lens group and wide angle performance.

If a value is greater than the conditional equation (4), refracting power of the movable lens group is decreased. Thereby, field correction of peripheral light beams may not be effectively performed, and thus the field curvature of peripheral light beams may not be corrected. Therefore, a wide angle may not be achieved.

In contrast, if a value is smaller than the lower limit value of the conditional equation (4), since magnification of the movable lens group is increased so as to match the reduction magnification of the overall lenses for effective camera shake correction, sensitivity of the movable lens group is increased and thus control accuracy of an optical stabilizer mechanism is reduced.

Therefore, by the zoom lens satisfying the conditional equation (4), a wide angle can be achieved by favorably correcting a field curvature of peripheral light beams, and favorable control accuracy of the optical stabilizer mechanism can be secured by increasing magnification of the movable lens group so as to match the reduction magnification of the overall lenses and suppressing an increase in sensitivity of the movable lens group.

The conditional equation (5) defines a relationship between the movable lens group of the fifth lens group, anti-shake performance, and a lens size.

If a value is greater than the conditional equation (5), since magnification of the movable lens group is increased so as to match the reduction magnification of the overall lenses for effective camera shake correction, sensitivity of the movable lens group is increased and thus control accuracy of an optical stabilizer mechanism is reduced.

If a value is smaller than the lower limit value of the conditional equation (5), magnification of the movable lens group with respect to magnification of the overall lenses is reduced so as to increase a movement amount of the movable lens group, thereby causing a large size in the diameter direction of the lens.

Therefore, by the zoom lens satisfying the conditional equation (5), it is possible to secure favorable control accuracy of the optical stabilizer mechanism by suppressing an increase in sensitivity of the movable lens group and to achieve miniaturization of the lens in the diameter direction by decreasing a movement amount of the movable lens group.

In the zoom lens according to the embodiment of the present disclosure, there may be a configuration in which the fifth lens group includes the fixed group that has negative refracting power and is normally located at a fixed position, and a movable group that has positive refracting power, arranged in order from the object side to the image side, and the zoom lens satisfies the following conditional equations (4) $0.5<(|f5m|-5.2)/1.66<6.0$ and (5) $0.8<ft1\sim2/|f5m\times\phi|<3.1$, where $ft1\sim2$ is a synthetic focal length of the first lens group and the second lens group at the telephoto end, and $\phi$ is an effective diameter of a lens closest to the object side in the first lens group.

As described above, in addition to the configuration where the movable group having negative refracting power and the fixed group having positive refracting power are arranged in order from the object side to the image side, the fifth lens group may have a configuration where the fixed group having negative refracting power and the movable group having positive refracting power are arranged in order from the object side to the image side.

In such a configuration where the fixed group having negative refracting power and the movable group having positive refracting power are arranged in order from the object side to the image side as well, the conditional equations (4) and (5) are satisfied, and thereby the effects according to the conditional equations (4) and (5) are achieved.

That is to say, the zoom lens satisfies the conditional equation (4), thereby a wide angle can be achieved by favorably correcting a field curvature of peripheral light beams, and favorable control accuracy of the optical stabilizer mechanism can be secured by increasing magnification of the movable lens group so as to match the reduction magnification of the overall lenses and suppressing an increase in sensitivity of the movable lens group.

Further, the zoom lens satisfies the conditional equation (5), and thereby it is possible to secure favorable control accuracy of the optical stabilizer mechanism by suppressing an increase in sensitivity of the movable lens group and to achieve miniaturization of the lens in the diameter direction by decreasing a movement amount of the movable lens group.

In addition, by achieving a wide angle and miniaturization of the diameter of the lens closest to the object side in the first lens group, a distortion aberration which is necessarily difficult to correct is corrected through an image signal process, and a ratio of angles of view at the wide-angle ratio and the telephoto end obtained from an image plane after the distortion aberration is corrected is defined as a zoom ratio again. Thereby, a paraxial focal length ratio (general definition of a zoom ratio) is reduced, and therefore further miniaturization can be achieved.

In addition, by generating a negative distortion aberration at the wide-angle end and a positive distortion aberration at the telephoto end so as to be great, a variation in an angle of view after the distortion aberration is corrected is made to be far greater than a variation in a paraxial focal length, and thus miniaturization in a necessary zoom ratio is possible.

In the zoom lens according to the embodiment of the present disclosure, at least one face in the second lens group is preferably an aspherical surface.

In the zoom lens according to the embodiment of the present disclosure, at least one face in the third lens group is preferably an aspherical surface.

In the zoom lens according to the embodiment of the present disclosure, at least one face in the fourth lens group is preferably an aspherical surface.

Further, in the zoom lens according to the embodiment of the present disclosure, at least one face in the fifth lens group is preferably an aspherical surface.

As described above, at least one face in the second lens group, at least one face in the third lens group, at least one face in the fourth lens group, and at least one face in the fifth lens group are aspherical surfaces, thus all the aberrations can be favorably corrected by the aspherical surface, and thereby optical performance of the zoom lens can be improved.

Configuration of Zoom Lens According to Another Embodiment

A zoom lens according to another embodiment of the present disclosure includes a first lens group that has positive refracting power and is normally located at a fixed position, a second lens group that has negative refracting power and is movable in an optical axis direction for zooming, a third lens group that has positive refracting power and is normally located at a fixed position, and a fourth lens group that has positive refracting power and is movable in the optical axis direction for correction of a focal position due to the zooming and for focusing, arranged in order from an object side to an image side.

That is to say, in the zoom lens according to the embodiment of the present disclosure, the zoom lens has a four-group configuration of positive, negative, positive and positive refracting power, or positive, negative, positive and positive refracting power. The second lens group is moved in the optical axis direction for zooming, and the fourth lens group is moved in the optical axis direction for correction of a focal position due to zooming and for focusing.

The zoom lens according to another embodiment of the present disclosure satisfies the conditional equations (1) $1.00 < f3/f4 < 2.49$ and the conditional equation (2) $1.00 < |fw1\sim2/f2| < 1.50$, where f2 is a focal length of the second lens group, f3 is a focal length of the third lens group, f4 is a focal length of the fourth lens group, and $fw1\sim2$ is a synthetic focal length of the first lens group and the second lens group at the wide-angle end.

The zoom lens satisfies the conditional equation (1), and thus the imaging apparatus can favorably correct all the aberrations through the optimization of the ratio of the refracting power of the third lens group and the refracting power of the fourth lens group, and can achieve miniaturization through the reduction in the length of the overall optical system.

The zoom lens satisfies the conditional equation (2), and thereby the imaging apparatus can favorably correct a spherical aberration and an axial chromatic aberration generated in the first lens group when a high zoom ratio is attempted, and can achieve a wide angle by securing intense refracting power of the second lens group.

As described above, in the four-group configuration of positive, negative, positive, and positive refracting power, or positive, negative, positive and positive refracting power, the zoom lens can achieve a high zoom ratio, miniaturization, and a wide angle by satisfying the conditional equations (1) and (2).

Numerical Value Examples of Zoom Lens

Hereinafter, detailed embodiments of the zoom lens and numerical value examples where detailed numerical values are applied to the embodiments will be described with reference to the drawings and tables.

In addition, meanings or the like of signs shown in the following tables or description are as follows.

"Si" denotes a face number of an i-th face when counted from an object side to an image side, "Ri" denotes a curvature radius of the i-th face, and "Di" denotes an axial face distance (lens center thickness or air space) between the i-th face and the (i+1)-th face. "Ni" denotes a refractive index in the d ray (wavelength 587.6 nm) of a lens or the like starting from the i-th face, and "vi" denotes an Abbe number in the d ray of a lens or the like starting from the i-th face.

"STO" denotes a stop in relation to the "face number Si", and "ASP" denotes an aspherical face in relation to the "face number Si". "INFINITY" denotes that a corresponding face is a plane in relation to the "curvature radius Ri", and "variable" denotes that a corresponding distance is variable in relation to the "axial face distance Di".

"K" denotes a conical constant, and "A4", "A6", ... respectively denote the 4th, 6th, ... aspherical coefficients.

"f" denotes a focal length, "Fno." denotes an F number, and "ω" denotes a half angle of view.

In addition, in the respective Tables showing the following aspherical coefficients, "E-n" indicates an exponential expression having 10 as a base, that is, "10 to the minus n", and, for example, "0.12345E-05" indicates "0.12345×(10 to the −5)".

In addition, there are cases where a lens surface is aspherical in the zoom lens used in the respective embodiments. If a distance from the vertex of a lens surface in the optical axis direction is "x", a height in a direction perpendicular to the optical axis is "y", a paraxial curvature at the lens vertex is "c", a conical constant is "K", and 4th order, 6th order, 8th order, and 10th order aspherical coefficients are respectively A4, A6, A8, and A10, the aspherical shape is defined by the following Equation 1.

$$x = cy^2/(1+(1-(1+K)c^2y^2)^{1/2}) + A4y^4 + A6y^6 + A8y^8 + A10y^{10} \qquad \text{Equation 1}$$

First Embodiment

FIG. 1 is a diagram illustrating a lens configuration of a zoom lens 1 according to a first embodiment.

The zoom lens 1 includes a first lens group GR1, a second lens group GR2, a third lens group GR3, a fourth lens group GR4, and a fifth lens group GR5, arranged in order from an object side to an image side. The first lens group GR1 has positive refracting power, the second lens group GR2 has negative refracting power, the third lens group GR3 has positive refracting power, the fourth lens group GR4 has positive refracting power, and the fifth lens group GR5 has positive refracting power.

The first lens group GR1 is normally located at a fixed position, the second lens group GR2 is movable in an optical axis direction for zooming, and the third lens group GR3 is normally located at a fixed position. The fourth lens group GR4 is movable in the optical axis direction for correction of a focal position due to the zooming and for focusing.

The first lens group GR1 includes four lenses, a cemented lens array of a biconcave lens L1 positioned on the object side and a convex lens L2 positioned on the image side, a biconvex lens L3, and a convex lens L4 having a strong convex surface turned on the object side, arranged in order from the object side to the image side.

The second lens group GR2 includes three lenses, a concave lens L5 having a strong concave surface turned on the image side, and a cemented lens array of a biconcave lens L6 positioned on the object side and a biconvex lens L7 positioned on the image side, arranged in order from the object side to the image side.

The third lens group GR3 includes one lens of a biconvex lens L8.

The fourth lens group GR4 includes three lenses, a convex lens L9 having a convex surface turned on the object side, a concave lens L10 having a concave surface turned on the image side, and a biconvex lens L11, arranged in order from the object side to the image side, and the convex lens L9, the concave lens L10, and the biconvex lens L11 form a cemented lens array.

The fifth lens group GR5 includes two lenses, a concave lens L12 which forms a movable group and has negative refracting power and a concave surface turned on the image side, and a biconvex lens L13 which forms a fixed group and has positive refracting power and a convex surface turned on the object side, arranged in order from the object side to the image side. The movable group is movable in the direction perpendicular to the optical axis, and the fixed group is normally fixed.

A stop STO is disposed at a position around on the object side of the third lens group GR3.

A filter FL and a cover glass CG are disposed between the fifth lens group GR5 and an image surface IMG in order from the object side to the image side.

Table 1 shows lens data of the numerical value example 1 where detailed numerical values are applied to the zoom lens 1 according to the first embodiment.

TABLE 1

| Si | Ri | Di | Ni | vi |
|---|---|---|---|---|
| 1 | −73.721 | 1.5 | 1.847 | 23.78 |
| 2 | 54.25 | 4.2 | 1.593 | 68.62 |
| 3 | −46.112 | 0.15 | | |
| 4 | 60.955 | 2.026 | 1.697 | 55.46 |
| 5 | −165.279 | 0.15 | | |
| 6 | 22.622 | 1.889 | 1.883 | 40.81 |
| 7 | 47.743 | VARIABLE | | |
| 8(ASP) | 240.423 | 0.6 | 1.851 | 40.1 |
| 9(ASP) | 5.713 | 1.751 | | |
| 10 | −6.612 | 0.4 | 1.883 | 40.81 |
| 11 | 9.38 | 1.4 | 1.946 | 17.98 |
| 12 | −23.5 | VARIABLE | | |
| 13(STO) | INFINITY | 1 | | |
| 14(ASP) | 19.409 | 2.3 | 1.583 | 59.46 |
| 15(ASP) | −28.154 | VARIABLE | | |
| 16(ASP) | 11.806 | 1.9 | 1.821 | 42.71 |
| 17 | INFINITY | 1 | 1.923 | 20.88 |
| 18 | 9.845 | 1.812 | 1.639 | 55.45 |
| 19 | −12.477 | VARIABLE | | |
| 20(ASP) | 172.006 | 0.6 | 1.623 | 5.82 |
| 21(ASP) | 5.454 | 2.87 | | |
| 22(ASP) | 6.543 | 2.7 | 1.497 | 81.56 |
| 23(ASP) | −12.975 | 1.498 | | |
| 24 | INFINITY | 0.3 | 1.517 | 64.2 |
| 25 | INFINITY | 0.25 | | |
| 26 | INFINITY | 0.5 | 1.517 | 64.2 |
| 27 | INFINITY | 0.53 | | |
| IMG | INFINITY | | | |

In the zoom lens 1, both the surfaces (the 8th face and the 9th face) of the concave lens L5, both the surfaces (the 14th face and the 15th face) of the biconvex lens L8, the surface (the 16th face) on the object side of the convex lens L9, both the surfaces (the 20th face and the 21st face) of the concave lens L12, and both the surfaces (the 22nd face and the 23rd face) of the biconvex lens L13 have an aspherical shape.

Table 2 shows an aspherical coefficient of the aspherical surface in the numerical value example 1 along with a conical constant K.

TABLE 2

| Si | K | A4 | A6 | A8 | A10 |
|---|---|---|---|---|---|
| 8 | 0.000 | −2.12E−04 | 1.30E−05 | 1.49E−06 | −5.03E−08 |
| 9 | 0.000 | −5.14E−04 | 1.88E−05 | −1.64E−06 | 6.86E−07 |
| 14 | 0.000 | −2.73E−04 | −1.68E−06 | 4.70E−07 | 0.00E+00 |
| 15 | 0.000 | −2.46E−04 | 2.12E−06 | 4.23E−07 | 0.00E+00 |
| 16 | 0.000 | −2.74E−04 | 1.07E−06 | 2.22E−08 | 0.00E+00 |
| 20 | 0.000 | −1.57E−03 | 3.77E−04 | −4.15E−05 | 1.43E−06 |
| 21 | 0.000 | −1.91E−03 | 3.04E−04 | −2.00E−05 | −6.65E−07 |
| 22 | 0.000 | 8.88E−04 | −2.45E−04 | 5.16E−05 | −3.41E−06 |
| 23 | 0.000 | 3.62E−03 | −4.79E−04 | 1.05E−04 | −8.00E−06 |

In the zoom lens 1, when zooming is performed between a wide-angle end state and a telephoto end state, a face distance D7 between the first lens group GR1 and the second lens group GR2, a face distance D12 between the second lens group GR2 and the third lens group GR3 (the stop STO), a face distance D15 between the third lens group GR3 and the fourth lens group GR4, and a face distance D19 between the fourth lens group GR4 and the fifth lens group GR5 are varied.

Table 3 shows each face distance in a wide-angle end state (f=2.341), an intermediate focal length state (f=12.186), and a telephoto end state (f=63.214) along with an F number Fno. and a half angle of view $\omega$, according to the numerical value example 1.

TABLE 3

| f | 2.341 | 12.186 | 63.214 |
|---|---|---|---|
| Fno. | 1.89 | 2.49 | 3.48 |
| ω (°) | 34.4 | 6.97 | 1.34 |
| D7 | 0.798 | 14.772 | 21.577 |
| D12 | 21.679 | 7.705 | 0.9 |
| D15 | 6.918 | 3.945 | 6.864 |
| D19 | 2.233 | 5.207 | 2.288 |

Figure 2:
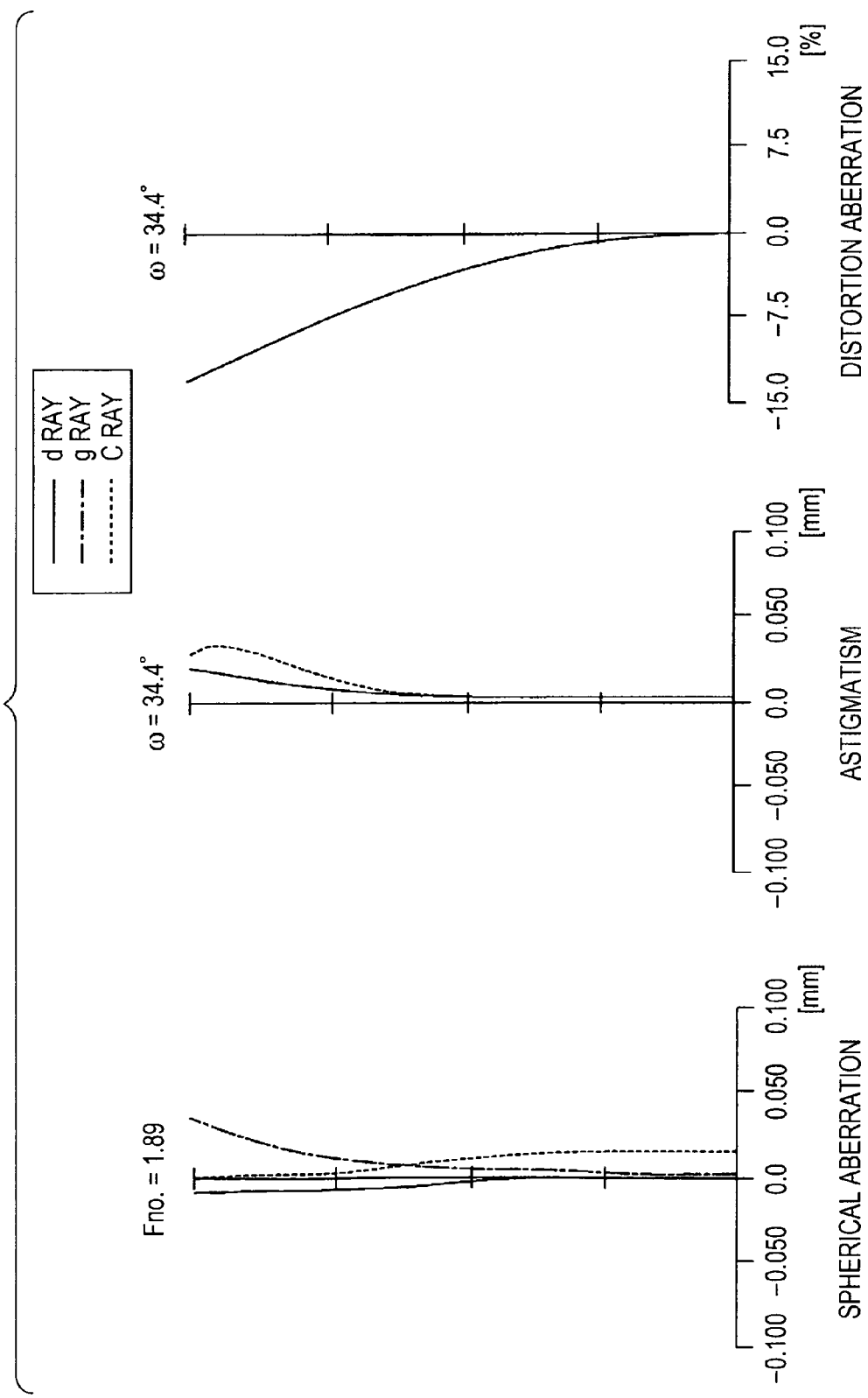
FIG. 2 is an aberration diagram in a numerical value example where detailed numerical values are applied to the first embodiment along with FIGS. 3 and 4, and is a diagram illustrating a spherical aberration, astigmatism, and a distortion aberration in a wide-angle end state.
Figure 3:
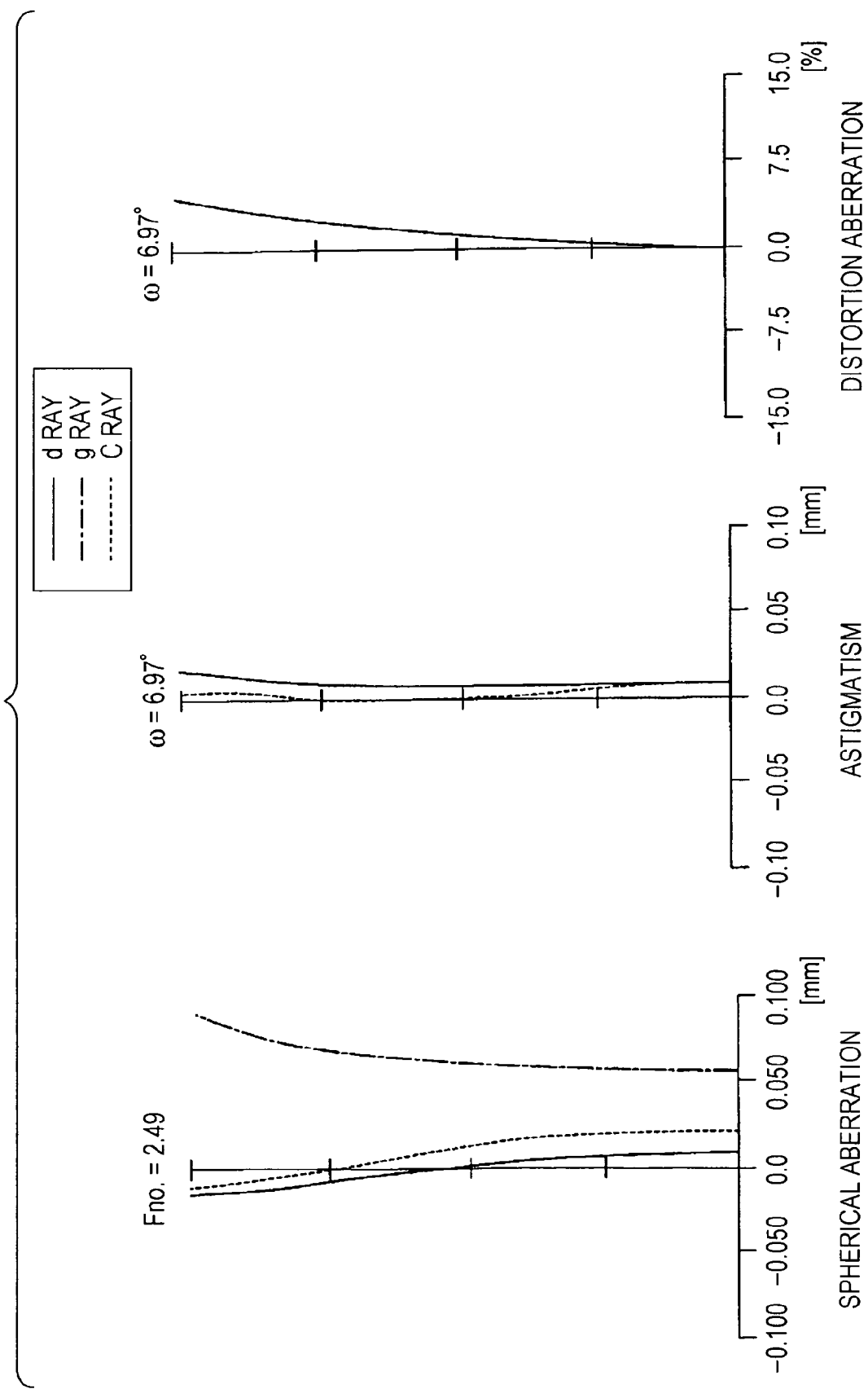
FIG. 3 is a diagram illustrating a spherical aberration, astigmatism, and a distortion aberration in an intermediate focal length state.
Figure 4:
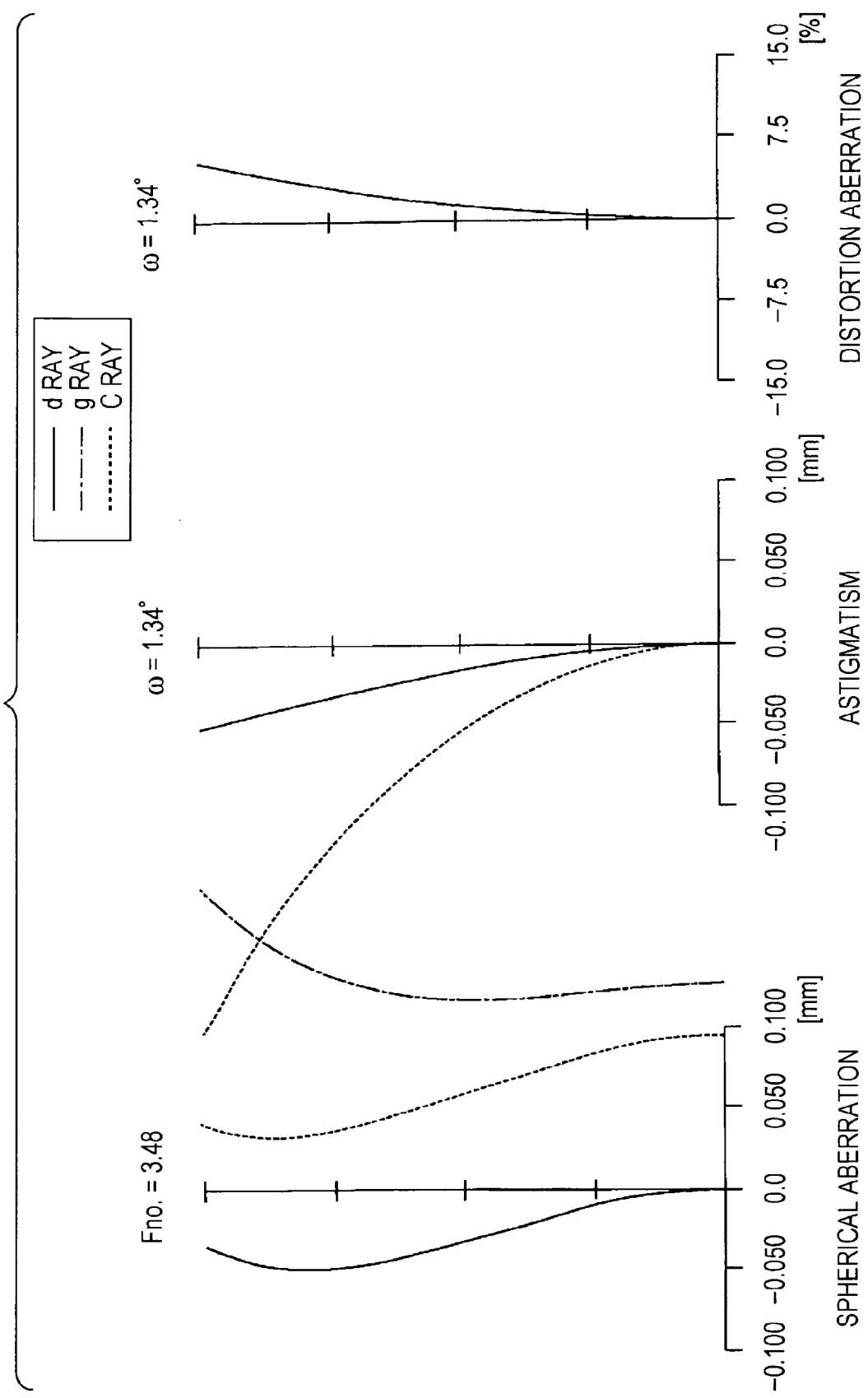
FIG. 4 is a diagram illustrating a spherical aberration, astigmatism, and a distortion aberration in a telephoto end state.

FIGS. 2 to 4 show all of aberrations in an infinity-focused state in the numerical value example 1, wherein FIGS. 2, 3 and 4 show a spherical aberration, astigmatism, and a distortion aberration in a wide-angle end state, in an intermediate focal length state, and in a telephoto end state, respectively.

In FIGS. 2 to 4, in the spherical aberration diagram, the solid line denotes a value at a d ray (wavelength 587.6 nm), the chain line denotes a value at a g ray (wavelength 435.8 nm), and the dotted line denotes a value at a c ray (wavelength 656.3 nm). In addition, in the astigmatism diagram, the solid line denotes a value at a sagittal image surface, and the dotted line denotes a value at a meridional image surface.

It is clear from the respective aberration diagrams that all the aberrations are corrected favorably and good image-forming performance is obtained according to the numerical value example 1.

Second Embodiment

Figure 5:
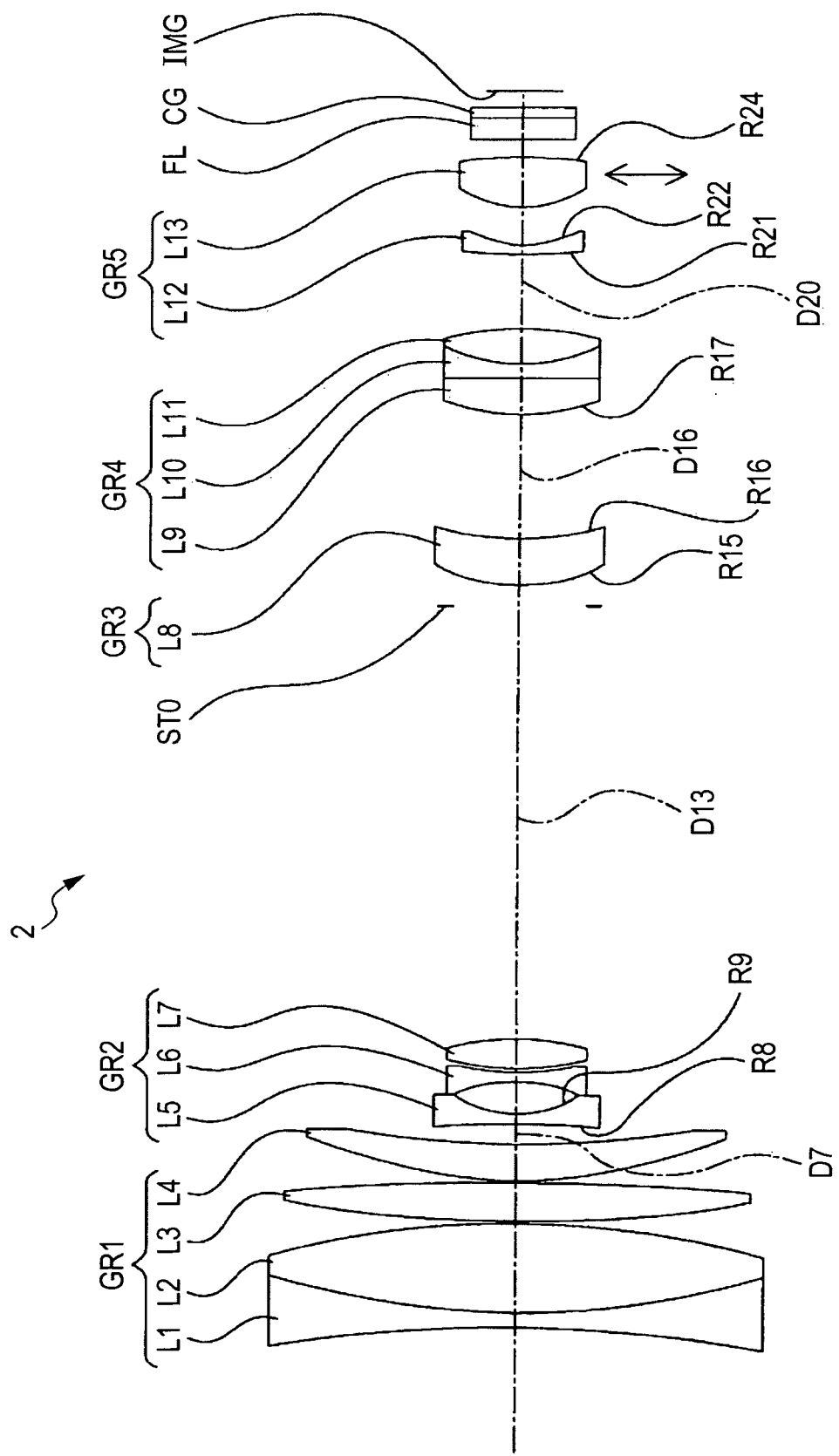
FIG. 5 is a diagram illustrating a lens configuration of a zoom lens according to a second embodiment.

FIG. 5 is a diagram illustrating a lens configuration of a zoom lens 2 according to a second embodiment.

The zoom lens 2 includes a first lens group GR1, a second lens group GR2, a third lens group GR3, a fourth lens group GR4, and a fifth lens group GR5, arranged in order from an object side to an image side. The first lens group GR1 has positive refracting power, the second lens group GR2 has negative refracting power, the third lens group GR3 has positive refracting power, the fourth lens group GR4 has positive refracting power, and the fifth lens group GR5 has negative refracting power.

The first lens group GR1 is normally located at a fixed position, the second lens group GR2 is movable in an optical axis direction for zooming, and the third lens group GR3 is normally located at a fixed position. The fourth lens group GR4 is movable in the optical axis direction for correction of a focal position due to the zooming and for focusing.

The first lens group GR1 includes four lenses, a cemented lens array of a biconcave lens L1 positioned on the object side and a convex lens L2 positioned on the image side, a biconvex lens L3, and a convex lens L4 having a strong convex surface turned on the object side, arranged in order from the object side to the image side.

The second lens group GR2 includes three lenses, a biconcave lens L5 having a strong concave surface turned on the image side, a biconcave lens L6, and a biconvex lens L7, arranged in order from the object side to the image side.

The third lens group GR3 includes one lens of a convex lens L8 having a convex surface turned on the object side.

The fourth lens group GR4 includes three lenses, a convex lens L9 having a convex surface turned on the object side, a concave lens L10 having a concave surface turned on the image side, and a biconvex lens L11, arranged in order from the object side to the image side, and the convex lens L9, the concave lens L10, and the biconvex lens L11 form a cemented lens array.

The fifth lens group GR5 includes two lenses, a concave lens L12 which forms a fixed group and has negative refracting power and a concave surface turned on the image side, and a biconvex lens L13 which forms a movable group and has positive refracting power and a convex surface turned on the object side, arranged in order from the object side to the image side. The movable group is movable in the direction perpendicular to the optical axis, and the fixed group is normally fixed.

A stop STO is disposed at a position around on the object side of the third lens group GR3.

A filter FL and a cover glass CG are disposed between the fifth lens group GR5 and an image surface IMG in order from the object side to the image side.

Table 4 shows lens data of the numerical value example 2 where detailed numerical values are applied to the zoom lens 2 according to the second embodiment.

TABLE 4

| Si | Ri | Di | Ni | vi |
|---|---|---|---|---|
| 1 | −66.667 | 0.85 | 1.847 | 23.78 |
| 2 | 39.659 | 4.329 | 1.593 | 68.62 |
| 3 | −51.988 | 0.15 | | |
| 4 | 60.473 | 2.018 | 1.773 | 49.62 |
| 5 | −136.857 | 0.15 | | |
| 6 | 24.67 | 1.845 | 1.911 | 0.35 |
| 7 | 64.309 | VARIABLE | | |
| 8(ASP) | −21.277 | 0.6 | 1.806 | 40.73 |
| 9(ASP) | 5.699 | 1.579 | | |
| 10 | −7.692 | 0.4 | 1.911 | 0.35 |
| 11 | 14.028 | 0.267 | | |
| 12 | 13.993 | 1.348 | 1.946 | 17.98 |
| 13 | −16.327 | VARIABLE | | |
| 14(STO) | INFINITY | 1.1 | | |
| 15(ASP) | 10.133 | 2.336 | 1.801 | 45.45 |
| 16(ASP) | 22.082 | VARIABLE | | |
| 17(ASP) | 10.212 | 1.8 | 1.583 | 59.46 |
| 18 | INFINITY | 0.676 | 1.847 | 23.78 |
| 19 | 8.315 | 1.724 | 1.697 | 55.46 |
| 20 | −15.187 | VARIABLE | | |
| 21(ASP) | 18.269 | 0.451 | 1.851 | 40.1 |
| 22(ASP) | 5.02 | 1.922 | | |
| 23 | 5.637 | 2.464 | 1.553 | 71.68 |
| 24(ASP) | −10.468 | 0.949 | | |
| 25 | INFINITY | 1.045 | 1.552 | 63.42 |
| 26 | INFINITY | 0.5 | 1.517 | 64.2 |
| 27 | INFINITY | 0.8 | | |
| IMG | INFINITY | | | |

In the zoom lens 2, both the surfaces (the 8th face and the 9th face) of the biconcave lens L5, both the surfaces (the 15th face and the 16th face) of the convex lens L8, the surface (the 17th face) on the object side of the convex lens L9, both the surfaces (the 21st face and the 22nd face) of the concave lens L12, and the surface (the 24th face) on the image side of the biconvex lens L13 have an aspherical shape.

Table 5 shows an aspherical coefficient of the aspherical surface in the numerical value example 2 along with a conical constant K.

TABLE 5

| Si | K | A4 | A6 | A8 | A10 |
|---|---|---|---|---|---|
| 8 | 0.000 | 2.36E−03 | −2.59E−04 | 1.66E−05 | −3.92E−07 |
| 9 | 0.000 | 2.25E−03 | −2.14E−04 | 3.54E−06 | 1.04E−06 |
| 15 | 0.000 | 2.45E−04 | 1.39E−05 | 1.86E−07 | 2.59E−09 |
| 16 | 0.000 | 4.46E−04 | 2.65E−05 | 3.09E−07 | 1.96E−08 |
| 17 | 0.000 | −3.42E−04 | 9.04E−06 | −3.72E−07 | 7.49E−09 |
| 21 | 0.000 | −2.81E−03 | 8.96E−05 | 6.51E−05 | −6.44E−06 |
| 22 | 0.000 | −3.28E−03 | −1.65E−04 | 1.44E−04 | −1.34E−05 |
| 24 | 0.000 | 2.45E−03 | 1.23E−04 | −3.00E−05 | 1.73E−06 |

In the zoom lens 2, when zooming is performed between a wide-angle end state and a telephoto end state, a face distance D7 between the first lens group GR1 and the second lens group GR2, a face distance D13 between the second lens group GR2 and the third lens group GR3 (the stop STO), a face distance D16 between the third lens group GR3 and the fourth lens group GR4, and a face distance D20 between the fourth lens group GR4 and the fifth lens group GR5 are varied.

Table 6 shows each face distance in a wide-angle end state (f=2.315), an intermediate focal length state (f=12.072), and a telephoto end state (f=62.952) along with an F number Fno. and a half angle of view ω, according to the numerical value example 2.

TABLE 6

| f | 2.315 | 12.072 | 62.952 |
|---|---|---|---|
| Fno. | 1.89 | 2.31 | 3.54 |
| ω (°) | 35 | 7 | 1.34 |
| D7 | 0.957 | 14.847 | 21.871 |
| D13 | 21.743 | 7.852 | 0.828 |
| D16 | 6.194 | 2.795 | 7.959 |
| D20 | 3.767 | 7.166 | 2.003 |

Figure 6:
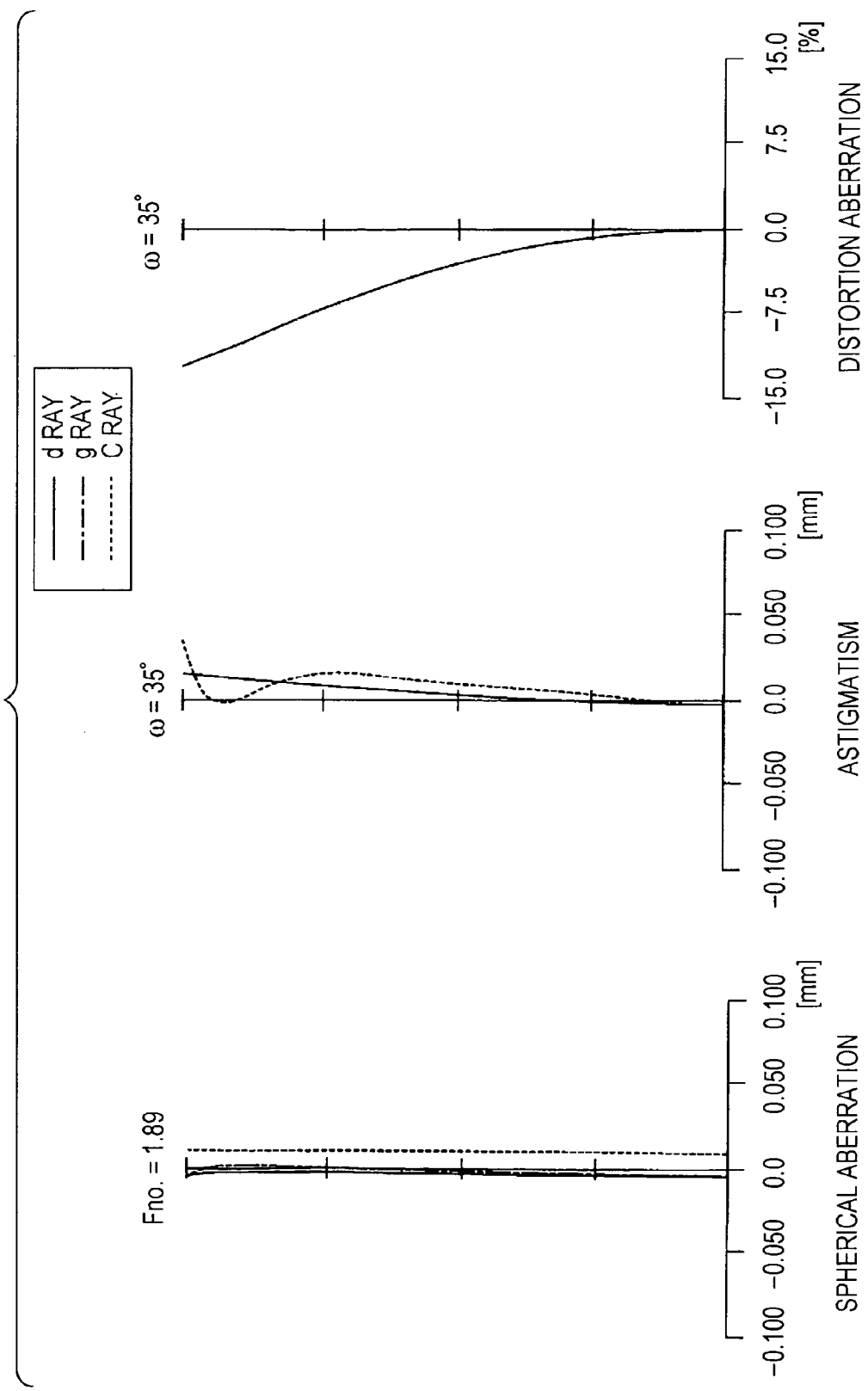
FIG. 6 is an aberration diagram in a numerical value example where detailed numerical values are applied to the second embodiment along with FIGS. 7 and 8, and is a diagram illustrating a spherical aberration, astigmatism, and a distortion aberration in a wide-angle end state.
Figure 7:
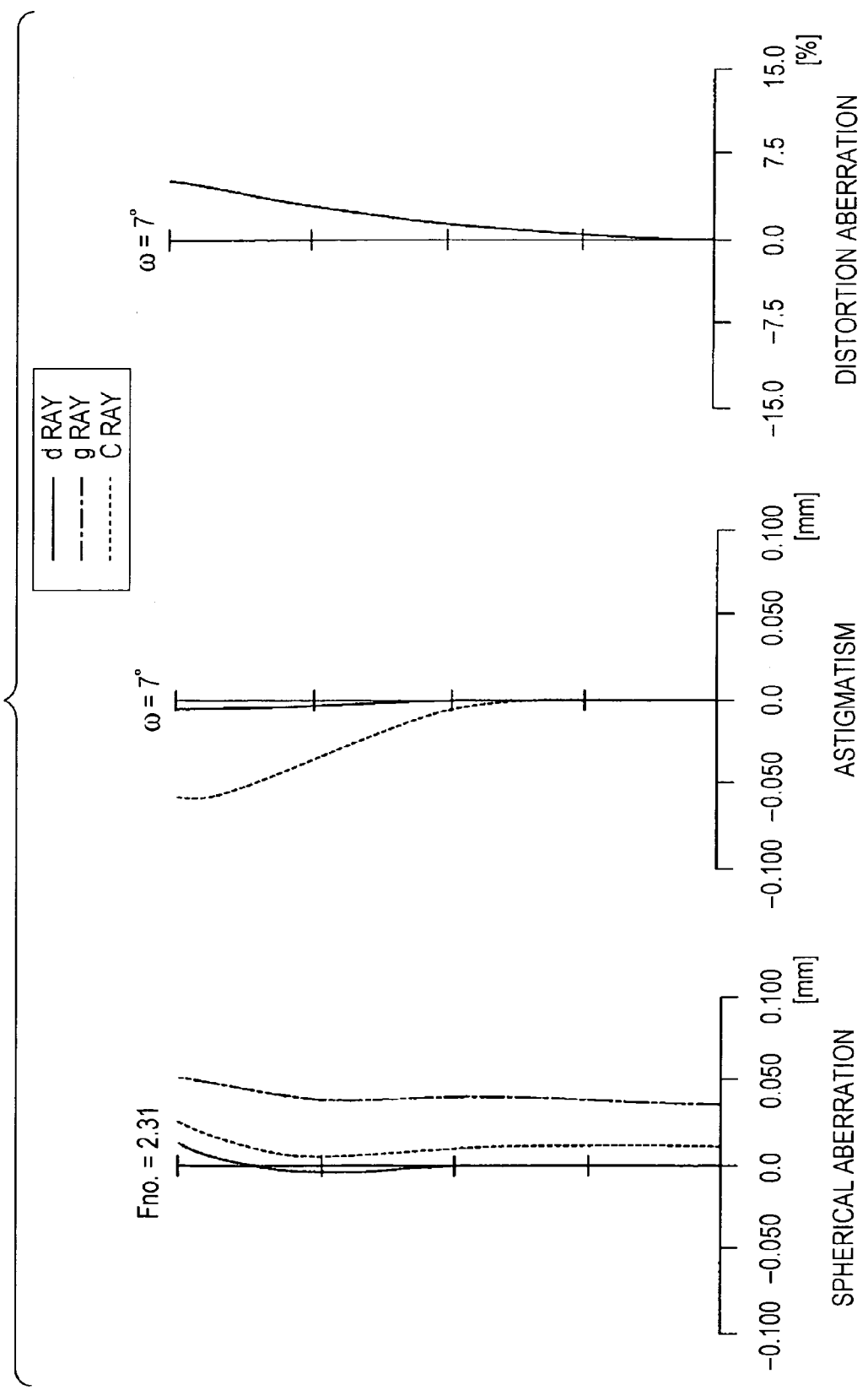
FIG. 7 is a diagram illustrating a spherical aberration, astigmatism, and a distortion aberration in an intermediate focal length state.
Figure 8:
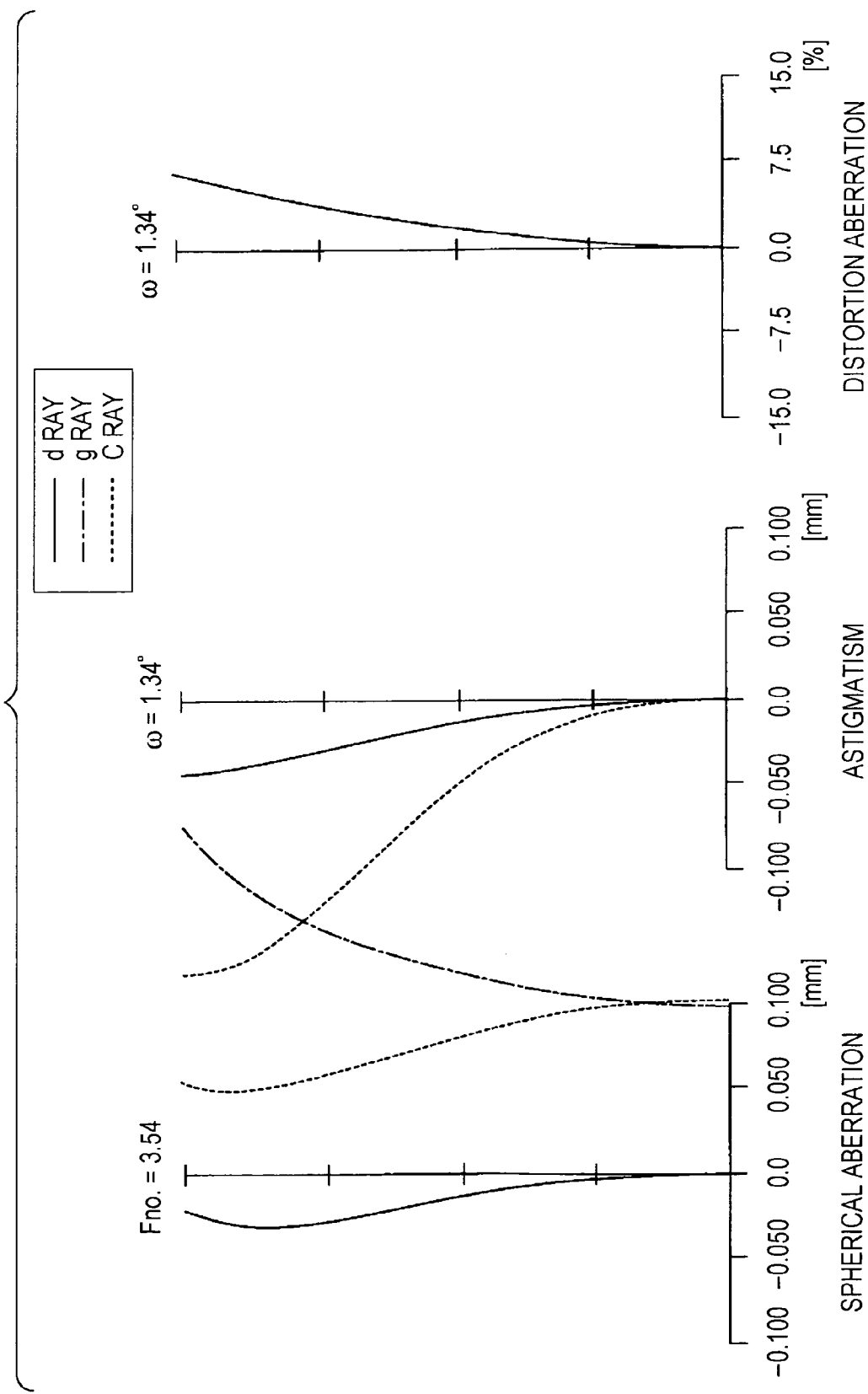
FIG. 8 is a diagram illustrating a spherical aberration, astigmatism, and a distortion aberration in a telephoto end state.

FIGS. 6 to 8 show all of aberrations in an infinity-focused state in the numerical value example 2, wherein FIGS. 6, 7 and 8 show a spherical aberration, astigmatism, and a distortion aberration in a wide-angle end state, in an intermediate focal length state, and in a telephoto end state, respectively.

In FIGS. 6 to 8, in the spherical aberration diagram, the solid line denotes a value at a d ray (wavelength 587.6 nm), the chain line denotes a value at a g ray (wavelength 435.8 nm), and the dotted line denotes a value at a c ray (wavelength 656.3 nm). In addition, in the astigmatism diagram, the solid line denotes a value at a sagittal image surface, and the dotted line denotes a value at a meridional image surface.

It is clear from the respective aberration diagrams that all the aberrations are corrected favorably and good image-forming performance is obtained according to the numerical value example 2.

Third Embodiment

Figure 9:
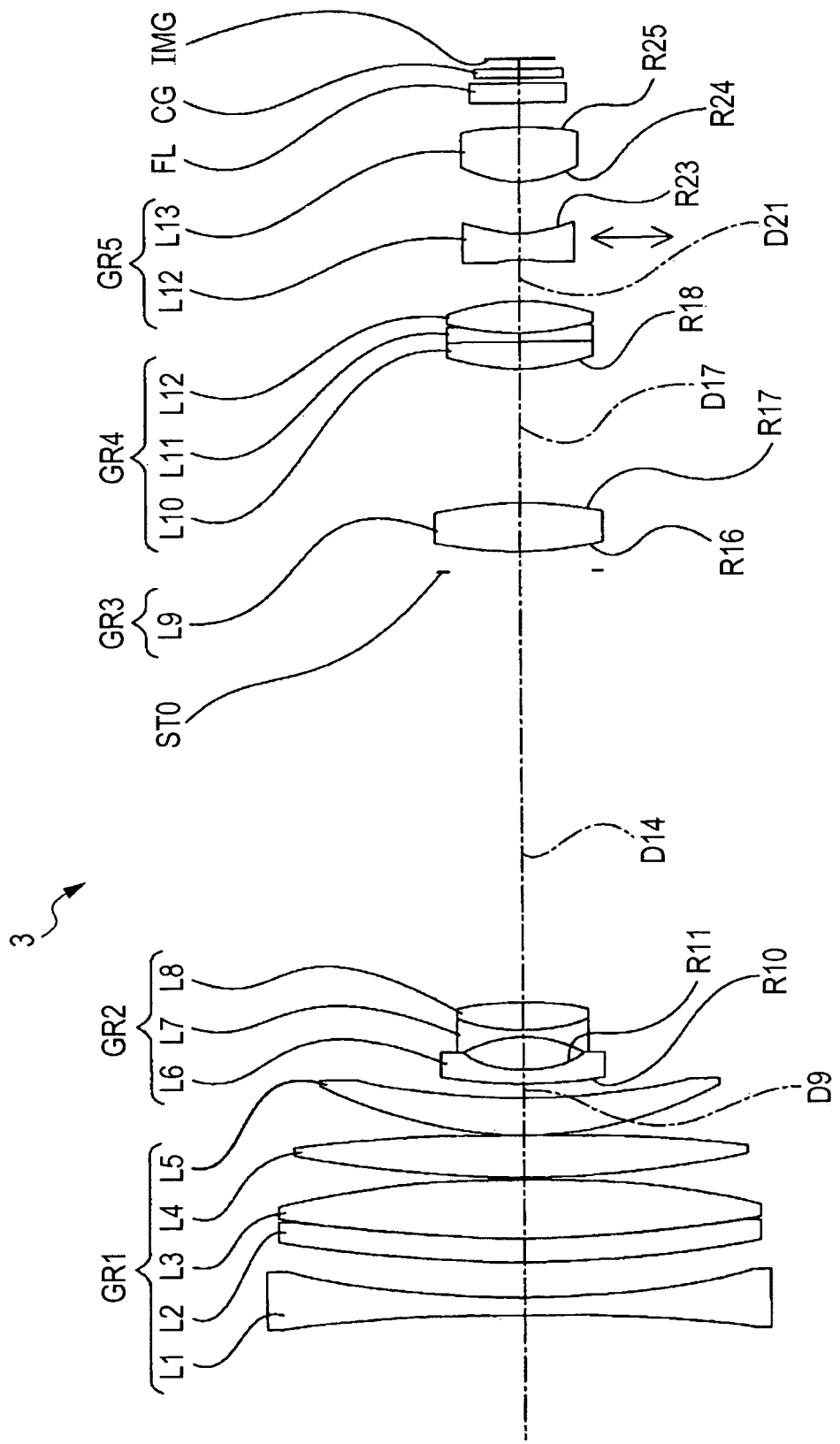
FIG. 9 is a diagram illustrating a lens configuration of a zoom lens according to a third embodiment.

FIG. 9 is a diagram illustrating a lens configuration of a zoom lens 3 according to a third embodiment.

The zoom lens 3 includes a first lens group GR1, a second lens group GR2, a third lens group GR3, a fourth lens group GR4, and a fifth lens group GR5, arranged in order from an object side to an image side. The first lens group GR1 has positive refracting power, the second lens group GR2 has negative refracting power, the third lens group GR3 has positive refracting power, the fourth lens group GR4 has positive refracting power, and the fifth lens group GR5 has negative refracting power.

The first lens group GR1 is normally located at a fixed position, the second lens group GR2 is movable in an optical axis direction for zooming, and the third lens group GR3 is normally located at a fixed position. The fourth lens group GR4 is movable in the optical axis direction for correction of a focal position due to the zooming and for focusing.

The first lens group GR1 includes five lenses, a biconcave lens L1, a cemented lens array of a concave meniscus lens L2 positioned on the object side and having a concave surface turned on the image side and a biconvex lens L3, a biconvex lens L4, and a convex lens L5 having a strong convex surface turned on the object side, arranged in order from the object side to the image side.

The second lens group GR2 includes three lenses, a concave lens L6 having a strong concave surface turned on the image side, and a cemented lens array of a biconcave lens L7 positioned on the object side and a biconvex lens L8 positioned on the image side, arranged in order from the object side to the image side.

The third lens group GR3 includes one lens of a biconvex lens L9.

The fourth lens group GR4 includes three lenses, a convex lens L10 having a convex surface turned on the object side, a concave lens L11 having a concave surface turned on the image side, and a biconvex lens L12, arranged in order from the object side to the image side, and the convex lens L10, the concave lens L11, and the biconvex lens L12 form a cemented lens array.

The fifth lens group GR5 includes two lenses, a biconcave lens L13 which forms a movable group and has negative refracting power, and a biconvex lens L14 which forms a fixed group and has positive refracting power, arranged in order from the object side to the image side. The movable group is movable in the direction perpendicular to the optical axis, and the fixed group is normally fixed.

A stop STO is disposed at a position around on the object side of the third lens group GR3.

A filter FL and a cover glass CG are disposed between the fifth lens group GR5 and an image surface IMG in order from the object side to the image side.

Table 7 shows lens data of the numerical value example 3 where detailed numerical values are applied to the zoom lens 3 according to the third embodiment.

TABLE 7

| Si | Ri | Di | Ni | vi |
|---|---|---|---|---|
| 1 | −82.587 | 0.9 | 1.923 | 20.88 |
| 2 | 57.388 | 1.866 | | |
| 3 | 74.654 | 1.214 | 1.946 | 17.98 |
| 4 | 76.747 | 3.081 | 1.618 | 63.4 |
| 5 | −51.331 | 0.15 | | |
| 6 | 63.207 | 2.1 | 1.911 | 0.35 |
| 7 | −143.149 | 0.15 | | |
| 8 | 21.458 | 2.034 | 1.62 | 60.34 |
| 9 | 48.659 | VARIABLE | | |
| 10(ASP) | 35.321 | 0.6 | 1.806 | 40.73 |
| 11(ASP) | 5.274 | 1.763 | | |
| 12 | −6.235 | 0.4 | 1.883 | 40.81 |
| 13 | 10.683 | 1.372 | 1.946 | 17.98 |
| 14 | −21.931 | VARIABLE | | |
| 15(STO) | INFINITY | 1.1 | | |
| 16(ASP) | 17.73 | 2.406 | 1.583 | 59.46 |
| 17(ASP) | −27.21 | VARIABLE | | |
| 18(ASP) | 9.916 | 1.392 | 1.694 | 53.2 |
| 19 | INFINITY | 0.451 | 1.923 | 20.88 |
| 20 | 14.522 | 1.597 | 1.497 | 81.61 |
| 21 | −11.065 | VARIABLE | | |
| 22 | −58.554 | 1.496 | 1.729 | 54.04 |
| 23(ASP) | 6.046 | 2.788 | | |
| 24(ASP) | 5.609 | 2.795 | 1.497 | 81.56 |
| 25(ASP) | −9.507 | 1.329 | | |
| 26 | INFINITY | 1.01 | 1.552 | 63.42 |
| 27 | INFINITY | 0.25 | | |
| 28 | INFINITY | 0.5 | 1.517 | 64.2 |
| 29 | INFINITY | 0.53 | | |
| IMG | INFINITY | | | |

In the zoom lens 3, both the surfaces (the 10th face and the 11th face) of the concave lens L6, both the surfaces (the 16th face and the 17th face) of the biconvex lens L9, the surface (the 18th face) on the object side of the convex lens L10, the surface (the 23rd face) on the image side of the biconcave lens L13, and both the surfaces (the 24th face and the 25th face) of the biconvex lens L14 have an aspherical shape.

Table 8 shows an aspherical coefficient of the aspherical surface in the numerical value example 3 along with a conical constant K.

TABLE 8

| Si | K | A4 | A6 | A8 | A10 |
|---|---|---|---|---|---|
| 10 | 0.000 | −1.20E−03 | 1.35E−04 | −6.34E−06 | 1.29E−07 |
| 11 | 0.000 | −1.80E−03 | 1.47E−04 | −5.97E−06 | 2.29E−07 |
| 16 | 0.000 | −1.34E−04 | −4.50E−06 | 2.79E−07 | 0.00E+00 |
| 17 | 0.000 | −9.29E−05 | −1.97E−06 | 2.68E−07 | 0.00E+00 |
| 18 | 0.000 | −3.49E−04 | −1.66E−06 | 8.15E−08 | −2.30E−09 |
| 23 | 0.000 | −1.51E−04 | −2.19E−04 | 4.40E−05 | −2.97E−06 |
| 24 | 0.000 | 4.98E−04 | −1.96E−04 | 3.18E−05 | −9.23E−07 |
| 25 | 0.000 | 3.91E−03 | −3.21E−04 | 4.64E−05 | −1.02E−06 |

In the zoom lens 3, when zooming is performed between a wide-angle end state and a telephoto end state, a face distance D9 between the first lens group GR1 and the second lens group GR2, a face distance D14 between the second lens group GR2 and the third lens group GR3 (the stop STO), a face distance D17 between the third lens group GR3 and the fourth lens group GR4, and a face distance D21 between the fourth lens group GR4 and the fifth lens group GR5 are varied.

Table 9 shows each face distance in a wide-angle end state (f=2.336), an intermediate focal length state (f=12.152), and a telephoto end state (f=63.221) along with an F number Fno. and a half angle of view ω, according to the numerical value example 3.

TABLE 9

| f | 2.336 | 12.152 | 63.221 |
|---|---|---|---|
| Fno. | 1.89 | 2.55 | 3.69 |
| ω (°) | 34.36 | 6.93 | 1.33 |
| D9 | 0.72 | 15.364 | 22.515 |
| D14 | 22.595 | 7.951 | 0.8 |
| D17 | 7.164 | 4.069 | 7.198 |
| D21 | 2.098 | 5.193 | 2.064 |

Figure 10:
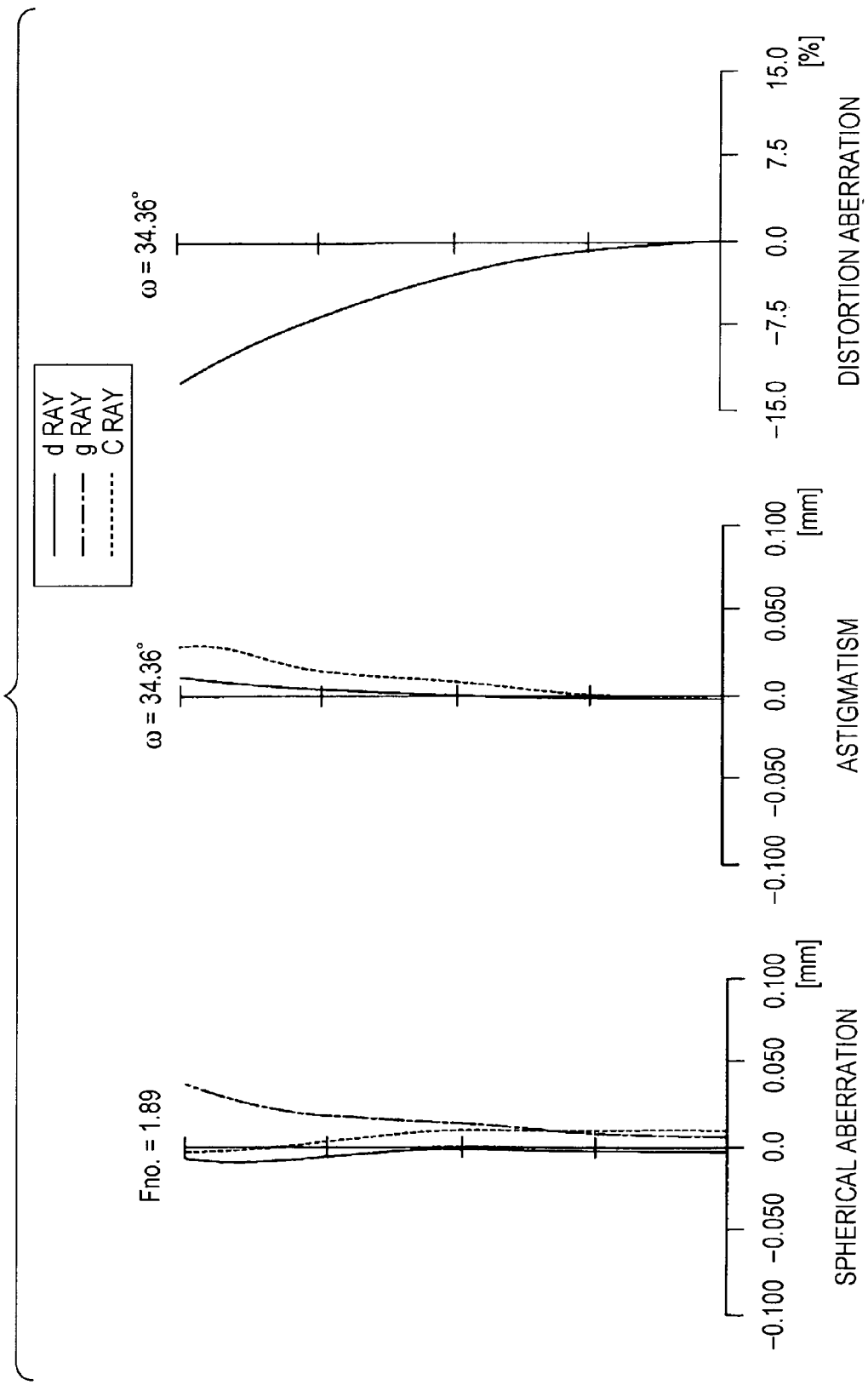
FIG. 10 is an aberration diagram in a numerical value example where detailed numerical values are applied to the third embodiment along with FIGS. 11 and 12, and is a diagram illustrating a spherical aberration, astigmatism, and a distortion aberration in a wide-angle end state.
Figure 11:
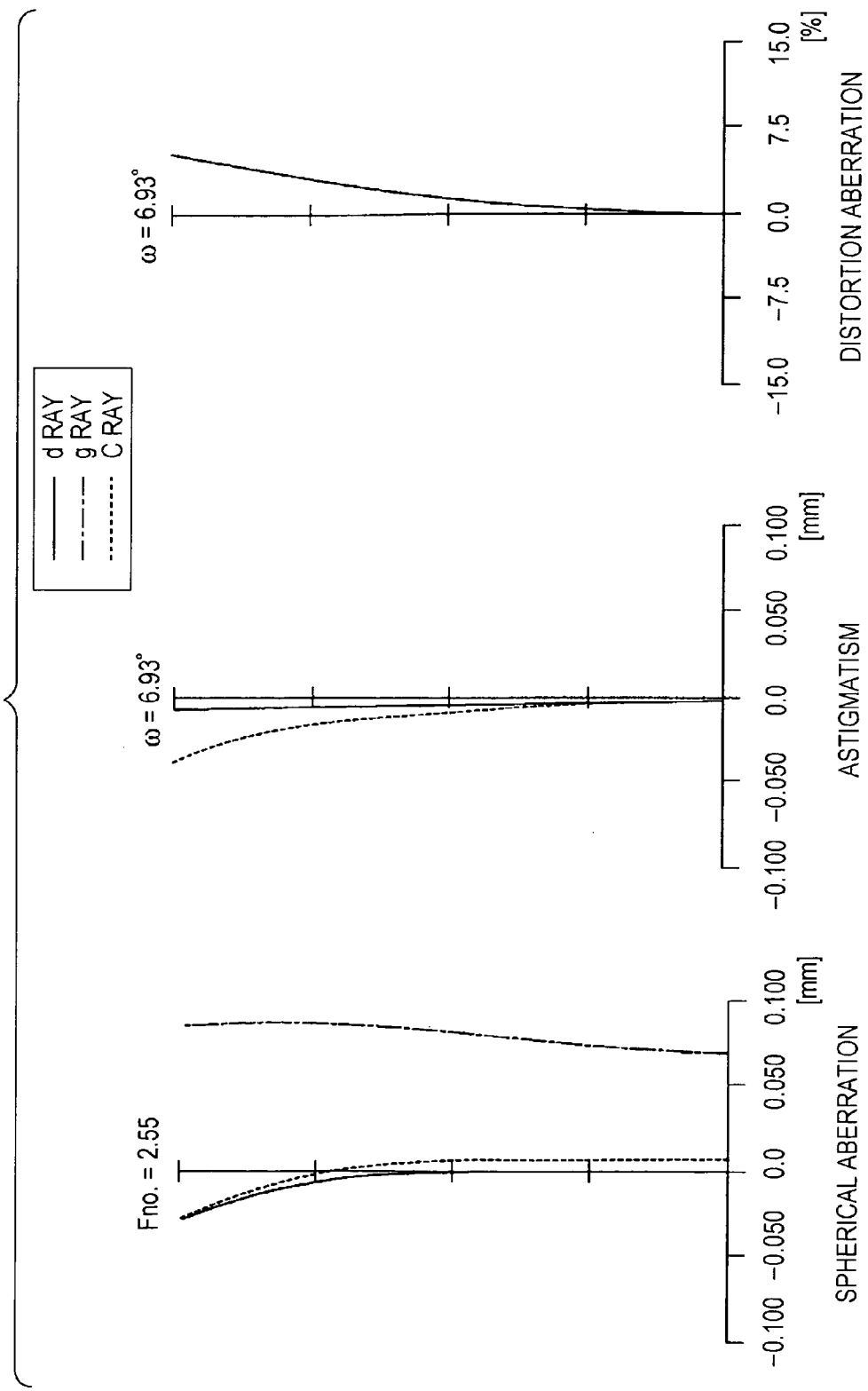
FIG. 11 is a diagram illustrating a spherical aberration, astigmatism, and a distortion aberration in an intermediate focal length state.
Figure 12:
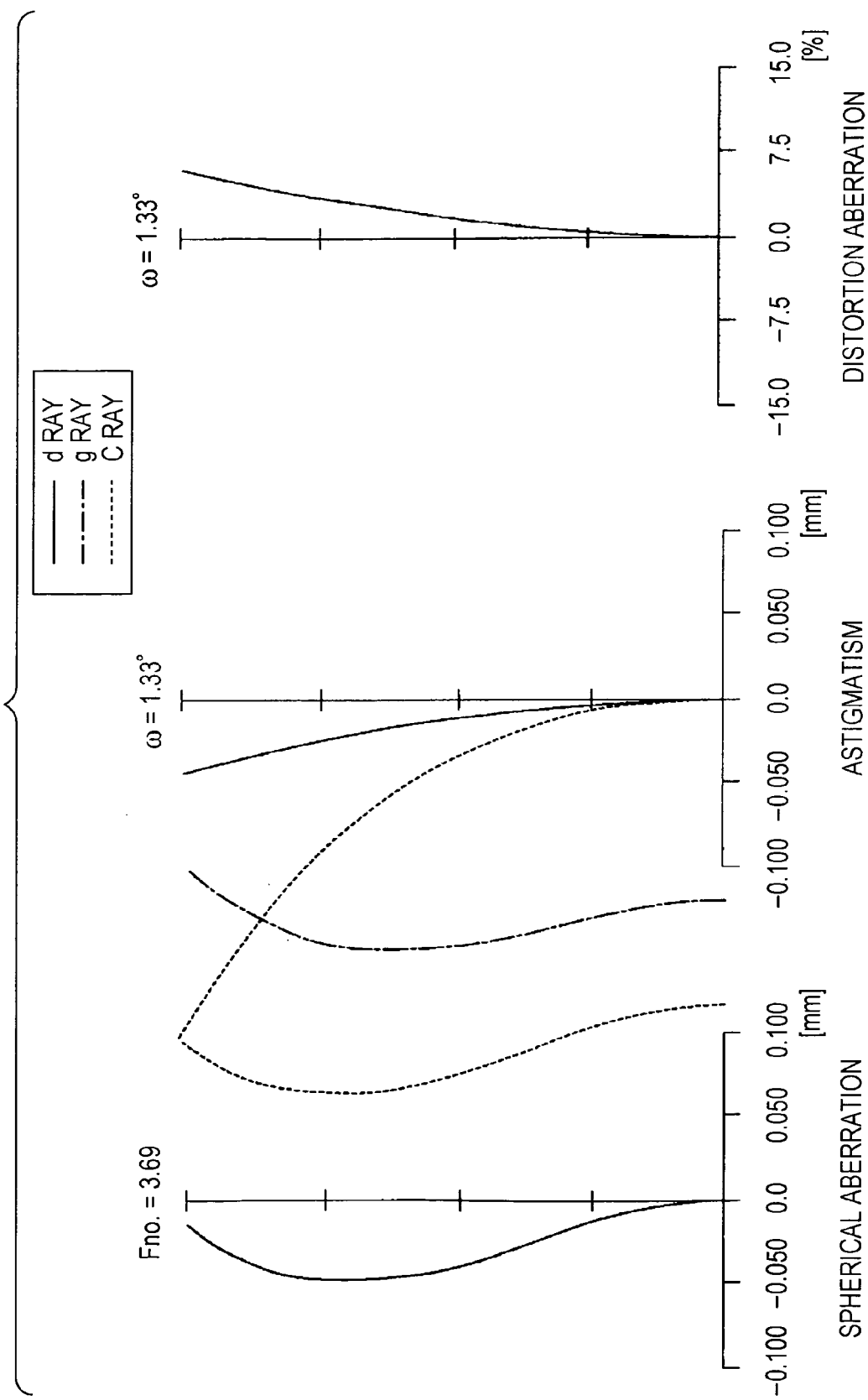
FIG. 12 is a diagram illustrating a spherical aberration, astigmatism, and a distortion aberration in a telephoto end state.

FIGS. 10 to 12 show all of aberrations in an infinity-focused state in the numerical value example 3, wherein FIGS. 10, 11 and 12 show a spherical aberration, astigmatism, and a distortion aberration in a wide-angle end state, in an intermediate focal length state, and in a telephoto end state, respectively.

In FIGS. 10 to 12, in the spherical aberration diagram, the solid line denotes a value at a d ray (wavelength 587.6 nm), the chain line denotes a value at a g ray (wavelength 435.8 nm), and the dotted line denotes a value at a c ray (wavelength 656.3 nm). In addition, in the astigmatism diagram, the solid line denotes a value at a sagittal image surface, and the dotted line denotes a value at a meridional image surface.

It is clear from the respective aberration diagrams that all the aberrations are corrected favorably and good image-forming performance is obtained according to the numerical value example 3.

Fourth Embodiment

Figure 13:
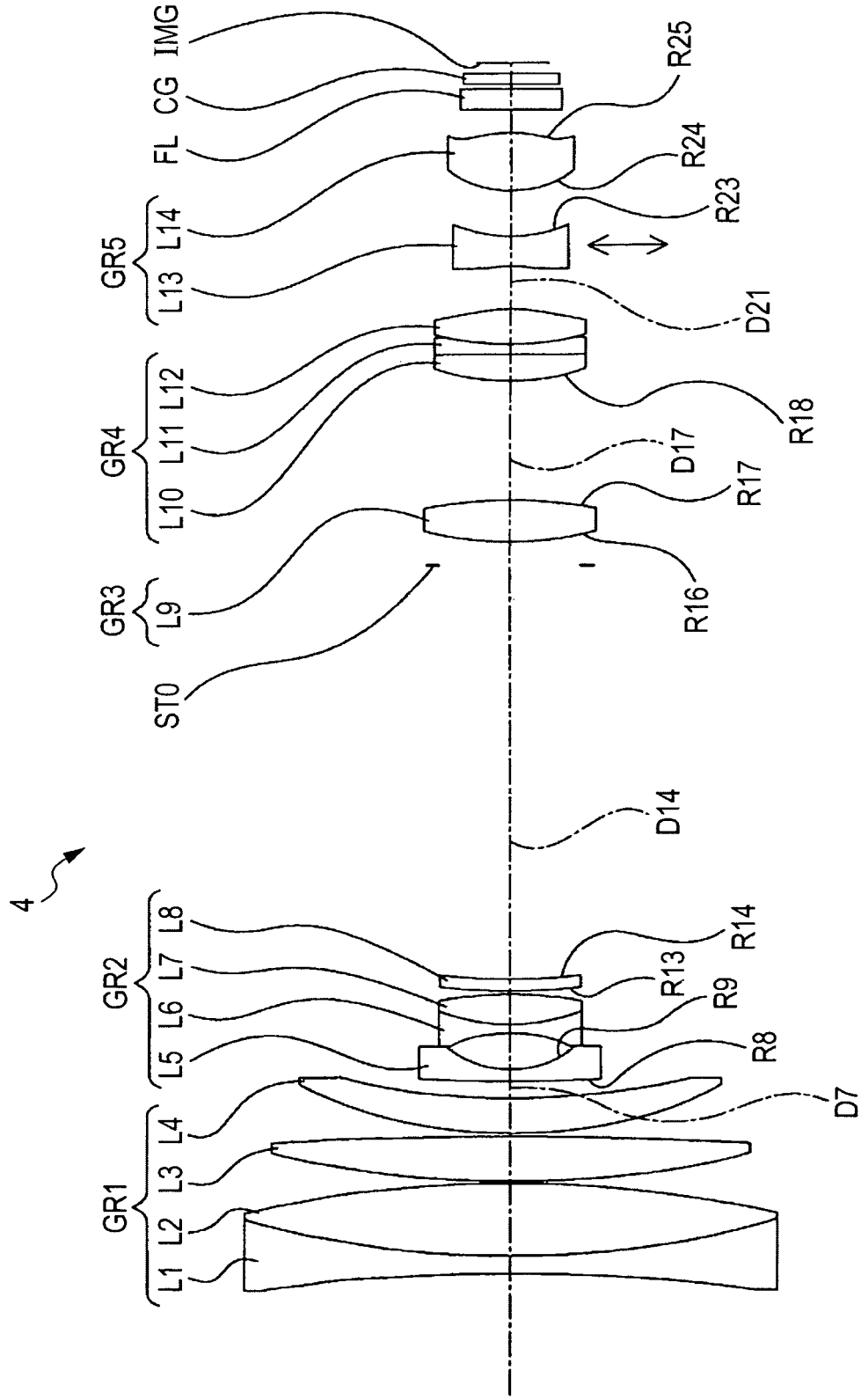
FIG. 13 is a diagram illustrating a lens configuration of a zoom lens according to a fourth embodiment.

FIG. 13 is a diagram illustrating a lens configuration of a zoom lens 4 according to a fourth embodiment.

The zoom lens 4 includes a first lens group GR1, a second lens group GR2, a third lens group GR3, a fourth lens group GR4, and a fifth lens group GR5, arranged in order from an object side to an image side. The first lens group GR1 has positive refracting power, the second lens group GR2 has negative refracting power, the third lens group GR3 has positive refracting power, the fourth lens group GR4 has positive refracting power, and the fifth lens group GR5 has positive refracting power.

The first lens group GR1 is normally located at a fixed position, the second lens group GR2 is movable in an optical axis direction for zooming, and the third lens group GR3 is normally located at a fixed position. The fourth lens group GR4 is movable in the optical axis direction for correction of a focal position due to the zooming and for focusing.

The first lens group GR1 includes four lenses, a cemented lens array of a biconcave lens L1 positioned on the object side and a biconvex lens L2 positioned on the image side, a biconvex lens L3, and a convex lens L4 having a strong convex surface turned on the object side, arranged in order from the object side to the image side.

The second lens group GR2 includes four lenses, a concave lens L5 having a strong concave surface turned on the image side, a cemented lens array of a biconcave lens L6 positioned on the object side and a biconvex lens L7 positioned on the image side, and a convex lens L8 having a concave surface turned on image side, arranged in order from the object side to the image side.

The third lens group GR3 includes one lens of a biconvex lens L9.

The fourth lens group GR4 includes three lenses, a convex lens L10 having a convex surface turned on the object side, a concave lens L11 having a concave surface turned on the image side, and a biconvex lens L12, arranged in order from the object side to the image side, and the convex lens L10, the concave lens L11, and the biconvex lens L12 form a cemented lens array.

The fifth lens group GR5 includes two lenses, a biconcave lens L13 which forms a movable group and has negative refracting power, and a biconvex lens L14 which forms a fixed group and has positive refracting power, arranged in order from the object side to the image side. The movable group is movable in the direction perpendicular to the optical axis, and the fixed group is normally fixed.

A stop STO is disposed at a position around on the object side of the third lens group GR3.

A filter FL and a cover glass CG are disposed between the fifth lens group GR5 and an image surface IMG in order from the object side to the image side.

Table 10 shows lens data of the numerical value example 4 where detailed numerical values are applied to the zoom lens 4 according to the fourth embodiment.

TABLE 10

| Si | Ri | Di | Ni | vi |
|---|---|---|---|---|
| 1 | −86.548 | 0.9 | 1.847 | 23.78 |
| 2 | 47.982 | 3.537 | 1.593 | 68.62 |
| 3 | −52.448 | 0.15 | | |
| 4 | 51.14 | 2.191 | 1.697 | 55.46 |
| 5 | −163.012 | 0.15 | | |
| 6 | 21.502 | 1.83 | 1.883 | 40.81 |
| 7 | 43.246 | VARIABLE | | |
| 8(ASP) | 91.662 | 0.6 | 1.806 | 40.73 |
| 9(ASP) | 4.794 | 1.821 | | |
| 10 | −7.092 | 0.4 | 1.883 | 40.81 |
| 11 | 9.573 | 1.473 | 1.946 | 17.98 |
| 12 | −20.387 | 0.15 | | |
| 13(ASP) | 18.058 | 0.6 | 1.806 | 40.73 |
| 14(ASP) | 14.567 | VARIABLE | | |
| 15(STO) | INFINITY | 1.1 | | |

TABLE 10-continued

| Si | Ri | Di | Ni | vi |
|---|---|---|---|---|
| 16(ASP) | 14.084 | 2.066 | 1.583 | 59.46 |
| 17(ASP) | −26.234 | VARIABLE | | |
| 18(ASP) | 10.715 | 1.299 | 1.694 | 53.2 |
| 19 | INFINITY | 0.45 | 1.923 | 20.88 |
| 20 | 13.53 | 1.704 | 1.497 | 81.61 |
| 21 | −10.069 | VARIABLE | | |
| 22 | −27.754 | 1.5 | 1.729 | 54.04 |
| 23(ASP) | 5.993 | 2.336 | | |
| 24(ASP) | 5.131 | 2.8 | 1.497 | 81.56 |
| 25(ASP) | −8.011 | 1.2 | | |
| 26 | INFINITY | 1.01 | 1.552 | 63.42 |
| 27 | INFINITY | 0.25 | | |
| 28 | INFINITY | 0.5 | 1.517 | 64.2 |
| 29 | INFINITY | 0.53 | | |
| IMG | INFINITY | | | |

In the zoom lens 4, both the surfaces (the 8th face and the 9th face) of the concave lens L5, both the surfaces (the 13th face and the 14th face) of the convex lens L8, both the surfaces (the 16th face and the 17th face) of the biconvex lens L9, the surface (the 18th face) on the object side of the convex lens L10, the surface (the 23rd face) on the image side of the biconcave lens L13, and both the surfaces (the 24th face and the 25th face) of the biconvex lens L14 have an aspherical shape.

Table 11 shows an aspherical coefficient of the aspherical surface in the numerical value example 4 along with a conical constant K.

TABLE 11

| Si | K | A4 | A6 | A8 | A10 |
|---|---|---|---|---|---|
| 8 | 0.000 | 4.94E−04 | −1.41E−04 | 1.38E−05 | −3.94E−07 |
| 9 | 0.000 | 9.96E−04 | −1.75E−04 | −5.87E−06 | 2.66E−06 |
| 13 | 0.000 | 1.28E−03 | −4.28E−04 | 1.11E−05 | 1.10E−06 |
| 14 | 0.000 | 7.96E−04 | −4.09E−04 | 1.49E−05 | 7.23E−07 |
| 16 | 0.000 | 5.30E−06 | −1.88E−05 | 6.30E−07 | 0.00E+00 |
| 17 | 0.000 | 9.46E−05 | −1.72E−05 | 6.47E−07 | 0.00E+00 |
| 18 | 0.000 | −3.59E−04 | −6.01E−06 | 1.75E−07 | 0.00E+00 |
| 23 | 0.000 | −2.70E−04 | −1.68E−04 | 2.96E−05 | −1.92E−06 |
| 24 | 0.000 | −1.56E−04 | −3.93E−06 | 6.18E−06 | 5.43E−07 |
| 25 | 0.000 | 3.10E−03 | 1.51E−04 | −3.10E−05 | 4.49E−06 |

In the zoom lens 4, when zooming is performed between a wide-angle end state and a telephoto end state, a face distance D7 between the first lens group GR1 and the second lens group GR2, a face distance D14 between the second lens group GR2 and the third lens group GR3 (the stop STO), a face distance D17 between the third lens group GR3 and the fourth lens group GR4, and a face distance D21 between the fourth lens group GR4 and the fifth lens group GR5 are varied.

Table 12 shows each face distance in a wide-angle end state (f=2.327), an intermediate focal length state (f=12.165), and a telephoto end state (f=63.507) along with an F number Fno. and a half angle of view ω, according to the numerical value example 4.

TABLE 12

| f | 2.327 | 12.165 | 63.507 |
|---|---|---|---|
| Fno. | 1.89 | 2.46 | 3.51 |
| ω (°) | 34.48 | 6.98 | 1.33 |
| D7 | 0.781 | 13.974 | 20.363 |
| D14 | 20.382 | 7.188 | 0.8 |
| D17 | 5.918 | 2.742 | 5.911 |
| D21 | 2.102 | 5.278 | 2.11 |

Figure 14:
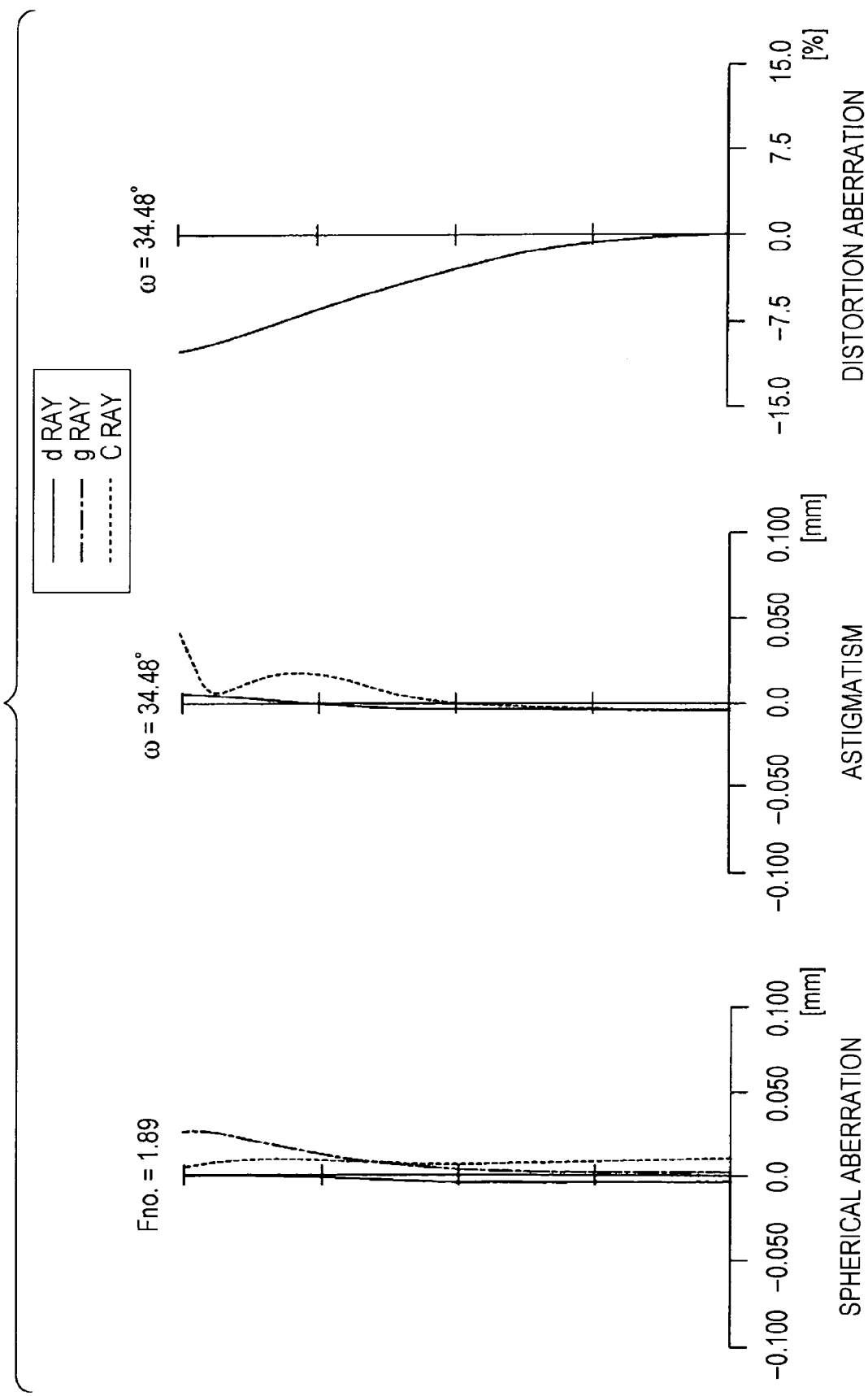
FIG. 14 is an aberration diagram in a numerical value example where detailed numerical values are applied to the fourth embodiment along with FIGS. 15 and 16, and is a diagram illustrating a spherical aberration, astigmatism, and a distortion aberration in a wide-angle end state.
Figure 15:
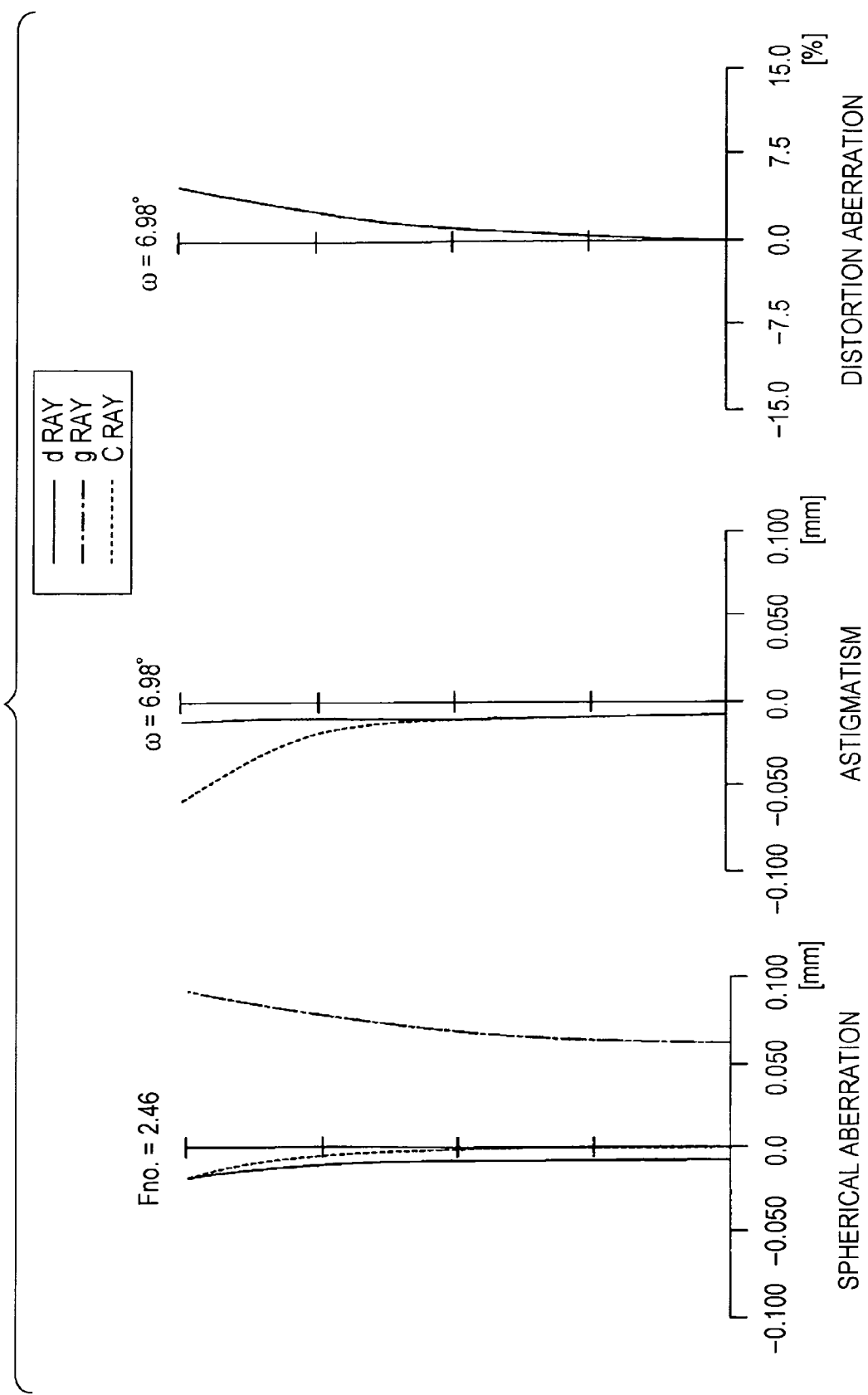
FIG. 15 is a diagram illustrating a spherical aberration, astigmatism, and a distortion aberration in an intermediate focal length state.
Figure 16:
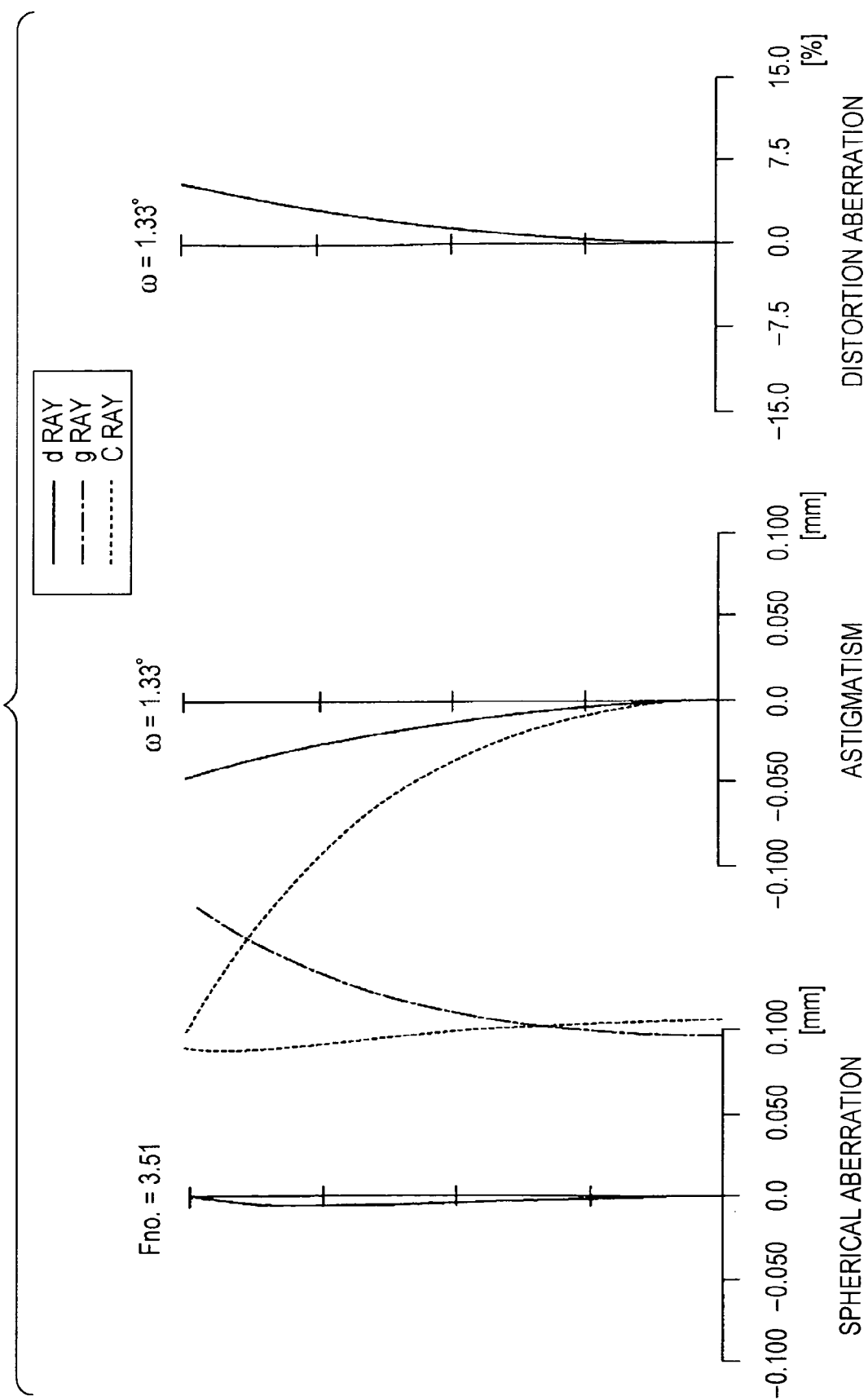
FIG. 16 is a diagram illustrating a spherical aberration, astigmatism, and a distortion aberration in a telephoto end state.

FIGS. 14 to 16 show all of aberrations in an infinity-focused state in the numerical value example 4, wherein FIGS. 14, 15 and 16 show a spherical aberration, astigmatism, and a distortion aberration in a wide-angle end state, in an intermediate focal length state, and in a telephoto end state, respectively.

In FIGS. 14 to 16, in the spherical aberration diagram, the solid line denotes a value at a d ray (wavelength 587.6 nm), the chain line denotes a value at a g ray (wavelength 435.8 nm), and the dotted line denotes a value at a c ray (wavelength 656.3 nm). In addition, in the astigmatism diagram, the solid line denotes a value at a sagittal image surface, and the dotted line denotes a value at a meridional image surface.

It is clear from the respective aberration diagrams that all the aberrations are corrected favorably and good image-forming performance is obtained according to the numerical value example 4.

Respective Values in Conditional Equations of Zoom Lens

Table 13 shows the respective values in the conditional equation (1) to the conditional equation (5) according to the numerical value example 1 to the numerical value example 4.

TABLE 13

| | | NUMERICAL VALUE EXAMPLE 1 | NUMERICAL VALUE EXAMPLE 2 | NUMERICAL VALUE EXAMPLE 3 | NUMERICAL VALUE EXAMPLE 4 |
|---|---|---|---|---|---|
| | f3 | 19.98 | 21.381 | 18.706 | 15.954 |
| | f4 | 11.519 | 12.422 | 12.165 | 12.613 |
| CONDITIONAL EQUATION (1) | f3/f4 | 1.74 | 1.72 | 1.54 | 1.27 |
| | fw1~2 | −5.295 | −5.604 | −5.348 | −5.11 |
| | f2 | −4.131 | −4.448 | −4.35 | −3.892 |
| CONDITIONAL EQUATION (2) | |fw1~2/f2| | 1.28 | 1.26 | 1.23 | 1.31 |
| | f1 | 27.669 | 27.001 | 27.817 | 26.687 |
| | f5m | −9.021 | 6.981 | −7.411 | −6.607 |
| CONDITIONAL EQUATION (3) | |f1 × f5m|/100 | 2.50 | 1.885 | 2.06 | 1.76 |
| CONDITIONAL EQUATION (4) | (|f5m| − 5.2)/1.66 | 2.30 | 1.07 | 1.33 | 0.85 |
| | ft1~2 | −141.237 | −232.973 | −145.332 | −139.388 |
| | φ | 12 | 11 | 11.8 | 11.8 |
| CONDITIONAL EQUATION (5) | ft1~2/|f5m × φ| | 1.31 | 3.034 | 1.66 | 1.79 |

As is clear from Table 13, the numerical value example 1 to the numerical value example 4 satisfy the conditional equation (1) to the conditional equation (5).

Configuration of Imaging Apparatus According to an Embodiment

The imaging apparatus according to an embodiment of the present disclosure includes a zoom lens and an imaging device which converts an optical image formed by the zoom lens into an electric signal. The zoom lens includes a first lens group that has positive refracting power and is normally located at a fixed position, a second lens group that has negative refracting power and is movable in an optical axis direction for zooming, a third lens group that has positive refracting power and is normally located at a fixed position, a fourth lens group that has positive refracting power and is movable in the optical axis direction for correction of a focal position due to the zooming and for focusing, and a fifth lens group, arranged in order from an object side to an image side.

That is to say, in the imaging apparatus according to the embodiment of the present disclosure, the zoom lens has a five-group configuration of positive, negative, positive, positive and positive refracting power, or positive, negative, positive, positive and negative refracting power. The second lens group is moved in the optical axis direction for zooming, and the fourth lens group is moved in the optical axis direction for correction of a focal position due to zooming and for focusing.

In the imaging apparatus according to the embodiment of the present disclosure, the zoom lens satisfies the conditional equation (1) $1.00<f3/f4<2.49$ and the conditional equation (2) $1.00<|fw1\sim2/f2|<1.50$, where f2 is a focal length of the second lens group, f3 is a focal length of the third lens group, f4 is a focal length of the fourth lens group, and fw1~2 is a synthetic focal length of the first lens group and the second lens group at the wide-angle end.

The conditional equation (1) defines a ratio of the refracting power of the third lens group which has positive refracting power and is normally located at a fixed position, and the refracting power of the fourth lens group which has positive refracting power and is movable in the optical axis direction for correction of a focal position due to zooming and for focusing.

If a value is smaller than the lower limit value of the conditional equation (1), the refracting power of the third lens group becomes too intense or the refracting power of the fourth lens group becomes too weak. If the refracting power of the third lens group becomes too intense, a spherical aberration is insufficiently corrected at the wide-angle end side, and correction due to variations in a spherical aberration is difficult during focusing. If the refracting power of the fourth lens group becomes too weak, a movement amount is increased during focusing, and thereby increasing aberration variations such as a field curvature and a comma aberration. In addition, a back focus is lengthened more than necessary, and thereby it is difficult to reduce the length of the overall optical system.

In contrast, if a value is greater than the upper limit value of the conditional equation (1), the refracting power of the third lens group becomes too weak, or the refracting power of the fourth lens group becomes too intense.

If the refracting power of the third lens group becomes too weak, a spherical aberration at the wide-angle end side is excessively corrected. If the refracting power of the fourth lens group becomes too intense, a spherical aberration at the wide-angle end side is insufficiently corrected.

Therefore, by the zoom lens satisfying the conditional equation (1), the imaging apparatus can favorably correct all the aberrations through the optimization of the ratio of the refracting power of the third lens group and the refracting power of the fourth lens group, and can achieve miniaturization through the reduction in the length of the overall optical system.

The conditional equation (2) defines a relationship between the focal length and wide angle performance of the second lens group.

If a value is smaller than the lower limit value of the conditional equation (2), the refracting power of the second lens group becomes too intense, and thus refracting power of the first lens group is relatively increased when a high zoom ratio is to be realized. Thereby, it is difficult to suppress a spherical aberration and an axial chromatic aberration generated in the first lens group at the telephoto end.

In contrast, if a value is greater than the upper limit of the conditional equation (2), the refracting power of the second lens group is reduced, and thus intense refracting power of the second lens group which is necessary for a wide angle may not be secured. Thereby, a wide angle may not be achieved.

Therefore, by the zoom lens satisfying the conditional equation (2), the imaging apparatus can favorably correct a spherical aberration and an axial chromatic aberration generated in the first lens group when a high zoom ratio is attempted, and can achieve a wide angle by securing intense refracting power of the second lens group.

As described above, in the five-group configuration of positive, negative, positive, positive and positive refracting power, or positive, negative, positive, positive and negative refracting power, the imaging apparatus can achieve a high zoom ratio, miniaturization, and a wide angle by satisfying the conditional equations (1) and (2).

In addition, the range of the conditional equation (1) is more preferably $1.10<f3/f4<2.00$ in order to more favorably correct all the aberrations and thus to further reduce the length of the overall optical system.

In addition, the range of the conditional equation (2) is more preferably $1.10<|fw1\sim2/f2|<1.40$ in order to achieve a higher zoom ratio by more favorably correcting a spherical aberration and an axial chromatic aberration generated in the first lens group and to achieve a wider angle by securing more intense refracting power of the second lens group.

Configuration of Imaging Apparatus According to Another Embodiment

The imaging apparatus according to another embodiment of the present disclosure includes a zoom lens and an imaging device which converts an optical image formed by the zoom lens into an electric signal. The zoom lens includes a first lens group that has positive refracting power and is normally located at a fixed position, a second lens group that has negative refracting power and is movable in an optical axis direction for zooming, a third lens group that has positive refracting power and is normally located at a fixed position, and a fourth lens group that has positive refracting power and is movable in the optical axis direction for correction of a focal position due to the zooming and for focusing, arranged in order from an object side to an image side.

That is to say, in the imaging apparatus according to the embodiment of the present disclosure, the zoom lens has a four-group configuration of positive, negative, positive, and positive refracting power, or positive, negative, positive and positive refracting power. The second lens group is moved in the optical axis direction for zooming, and the fourth lens group is moved in the optical axis direction for correction of a focal position due to zooming and for focusing.

The imaging apparatus according to another embodiment of the present disclosure satisfies the conditional equation (1)

1.00<f3/f4<2.49 and the conditional equation (2) 1.00<|fw1~2/f2|<1.50, where f2 is a focal length of the second lens group, f3 is a focal length of the third lens group, f4 is a focal length of the fourth lens group, and fw1~2 is a synthetic focal length of the first lens group and the second lens group at the wide-angle end.

The zoom lens satisfies the conditional equation (1), and thus the imaging apparatus can favorably correct all the aberrations through the optimization of the ratio of the refracting power of the third lens group and the refracting power of the fourth lens group, and can achieve miniaturization through the reduction in the length of the overall optical system.

The zoom lens satisfies the conditional equation (2), and thereby the imaging apparatus can favorably correct a spherical aberration and an axial chromatic aberration generated in the first lens group when a high zoom ratio is attempted, and can achieve a wide angle by securing intense refracting power of the second lens group.

As described above, in the four-group configuration of positive, negative, positive and positive refracting power, or positive, negative, positive and positive refracting power, the imaging apparatus can achieve a high zoom ratio, miniaturization, and a wide angle by satisfying the conditional equations (1) and (2).

Example of Imaging Apparatus

Figure 17:
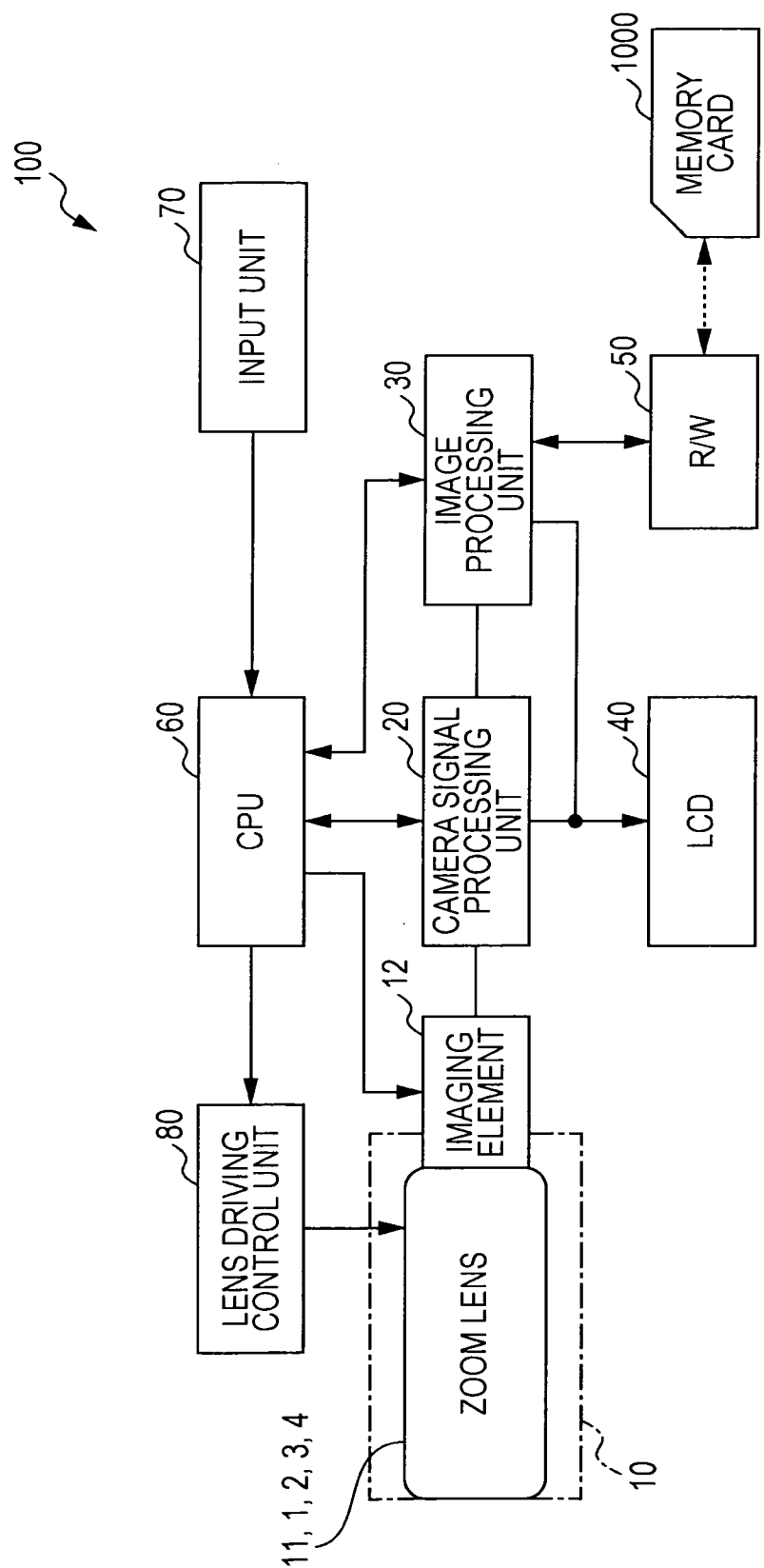
FIG. 17 is a block diagram illustrating an example of the imaging apparatus.

FIG. 17 shows a block diagram of a digital video camera which is an example of the imaging apparatus according to the embodiments of the present disclosure.

The imaging apparatus (digital video camera) 100 includes a camera block 10 having an imaging function, a camera signal processing unit 20 which performs a signal process such as analog-digital conversion of a captured image signal, and an image processing unit 30 which performs recording and reproduction processes for an image signal. In addition, the imaging apparatus 100 includes an LCD (Liquid Crystal Display) 40 which displays captured images, an R/W (reader/writer) 50 which writes and reads an image signal in and from a memory card 1000, a CPU (Central Processing Unit) 60 which controls the overall imaging apparatus, an input unit 70 which is used for a user to perform necessary operations and includes various switches and the like, and a lens driving control unit 80 which controls driving of lenses disposed in the camera block 10.

The camera block 10 has an optical system including a zoom lens 11 (the zoom lenses 1, 2, 3 and 4 according to the embodiments of the present disclosure), and an imaging device 12 such as, a CCD (Charge Coupled Device) or a CMOS (Complementary Metal-Oxide Semiconductor).

The camera signal processing unit 20 performs various signal processes for an output signal from the imaging device 12 such as conversion into a digital signal, noise cancelling, image quality correction, and conversion into a luminance and color difference signal.

The image processing unit 30 performs compression encoding and decompression decoding processes or a conversion process of a data specification such as a resolution for the image signal based on a predetermined image data format.

The LCD 40 displays an operation state of a user to the input unit 70 or a variety of data such as captured images.

The R/W 50 writes image data encoded by the image processing unit 30 in the memory card 1000 and reads image data recorded in the memory card 1000.

The CPU 60 functions as a control processing unit which controls the respective circuit blocks installed in the imaging apparatus 100, and controls the respective circuit blocks based on an instruction input signal from the input unit 70 or the like.

The input unit 70 includes, for example, a shutter-release button, a selection switch for selecting an operation mode, and the like, and outputs an instruction input signal corresponding to an operation by the user to the CPU 60.

The lens driving control unit 80 controls motors (not shown) which drive the respective lenses of the zoom lens 11 based on a control signal from the CPU 60.

The memory card 1000 is, for example, a semiconductor memory which is attachable to and detachable from a slot connected to the R/W 50.

Hereinafter, an operation of the imaging apparatus 100 will be described.

In a photographing stand-by state, a signal of an image captured by the camera block 10 is output to the LCD 40 via the camera signal processing unit 20 and is displayed as a camera-through image, under the control of the CPU 60. In addition, when an instruction input signal for zooming from the input unit 70, the CPU 60 outputs a control signal to the lens driving control unit 80, and a predetermined lens of the zoom lens 11 is moved based on the lens driving control unit 80.

When a shutter (not shown) of the camera block 10 is operated in response to an instruction input signal from the input unit 70, a captured image signal is output to the image processing unit 30 from the camera signal processing unit 20, and is converted into digital data with a predetermined data format through compression encoding. The converted data is output to the R/W 50 and is written in the memory card 1000.

In addition, in a case where, for example, the shutter-release button of the input unit 70 is half pressed, or is fully pressed for recording (photographing), the lens driving control unit 80 moves a predetermined lens of the zoom lens 11 based on a control signal from the CPU 60, thereby performing focusing.

In a case of reproducing image data recorded in the memory card 1000, predetermined image data is read from the memory card 1000 via the R/W 50 in response to an operation to the input unit 70, undergoes decompression decoding in the image processing unit 30, and then a reproduction image signal is output to the LCD 40 so as to be displayed as a reproduction image.

Although an example where the imaging apparatus is applied to the digital video camera has been described in the above embodiment, the imaging apparatus is not limited to the digital video camera and may be widely applied as a camera portion or the like of a digital input and output apparatus such as a digital still camera, a digital video camera, a camera-embedded mobile phone, or a camera-embedded PDA (Personal Digital Assistant).

The present disclosure contains subject matter related to that disclosed in Japanese Priority Patent Application JP 2010-278529 filed in the Japan Patent Office on Dec. 14, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
   a first lens group that has positive refracting power and is normally located at a fixed position, a second lens group that has negative refracting power and is movable in an optical axis direction for zooming, a third lens group that has positive refracting power and is normally located at a fixed position, a fourth lens group that has positive refracting power and is movable in the optical axis direction for correction of a focal position due to the zooming and for focusing, and a fifth lens group, arranged in order from an object side to an image side, wherein the zoom lens satisfies the following conditional equations (1) and (2):

(1) $1.00<f3/f4<2.49$ and (2) $1.00<|fw1\sim2/f2|<1.50$, where f2 is a focal length of the second lens group, f3 is a focal length of the third lens group, f4 is a focal length of the fourth lens group, and fw1~2 is a synthetic focal length of the first lens group and the second lens group at the wide-angle end.

2. The zoom lens according to claim 1, wherein at least one face in the second lens group is an aspherical surface.

3. The zoom lens according to claim 1, wherein at least one face in the third lens group is an aspherical surface.

4. The zoom lens according to claim 1, wherein at least one face in the fourth lens group is an aspherical surface.

5. The zoom lens according to claim 1, wherein at least one face in the fifth lens group is an aspherical surface.

6. The zoom lens according to claim 1, wherein the fifth lens group has a movable group that is movable in a direction perpendicular to the optical axis, wherein an image formed on an image surface can be moved in the direction perpendicular to the optical axis by moving the movable group in the direction perpendicular to the optical axis, and wherein the zoom lens satisfies the following conditional equation (3):

(3) $1.50<|f1\times f5m|/100<3.20$, where f1 is a focal length of the first lens group, and f5m is a focal length of the movable group in the fifth lens group.

7. The zoom lens according to claim 6, wherein the fifth lens group includes the movable group that has negative refracting power and a fixed group that has positive refracting power and is normally located at a fixed position, arranged in order from the object side to the image side, and wherein the zoom lens satisfies the following conditional equations (4) and (5):

(4) $0.5<(|f5m|-5.2)/1.66<6.0$ and (5) $0.8<ft1\sim2/|f5m\times\phi|<3.1$, where ft1~2 is a synthetic focal length of the first lens group and the second lens group at the telephoto end, and $\phi$ is an effective diameter of a lens closest to the object side in the first lens group.

8. The zoom lens according to claim 6, wherein the fifth lens group includes a fixed group that has negative refracting power and is normally located at a fixed position, and the movable group that has positive refracting power, arranged in order from the object side to the image side, and wherein the zoom lens satisfies the following conditional equations (4) and (5):

(4) $0.5<(|f5m|-5.2)/1.66<6.0$ and (5) $0.8<ft1\sim2/|f5m\times\phi|<3.1$, where ft1~2 is a synthetic focal length of the first lens group and the second lens group at the telephoto end, and $\phi$ is an effective diameter of a lens closest to the object side in the first lens group.

9. An imaging apparatus comprising:
a zoom lens; and
an imaging device that converts an optical image formed by the zoom lens into an electric signal,
wherein the zoom lens includes a first lens group that has positive refracting power and is normally located at a fixed position, a second lens group that has negative refracting power and is movable in an optical axis direction for zooming, a third lens group that has positive refracting power and is normally located at a fixed position, a fourth lens group that has positive refracting power and is movable in the optical axis direction for correction of a focal position due to the zooming and for focusing, and a fifth lens group, arranged in order from an object side to an image side, wherein the zoom lens satisfies the following conditional equations (1) and (2):

(1) $1.00<f3/f4<2.49$ and (2). $1.00<|fw1\sim2/f2|<1.50$, where f2 is a focal length of the second lens group, f3 is a focal length of the third lens group, f4 is a focal length of the fourth lens group, and fw1~2 is a synthetic focal length of the first lens group and the second lens group at the wide-angle end.

10. A zoom lens comprising:
a first lens group that has positive refracting power and is normally located at a fixed position, a second lens group that has negative refracting power and is movable in an optical axis direction for zooming, a third lens group that has positive refracting power and is normally located at a fixed position, and a fourth lens group that has positive refracting power and is movable in the optical axis direction for correction of a focal position due to the zooming and for focusing, arranged in order from an object side to an image side, wherein the zoom lens satisfies the following conditional equations (1) and (2):

(1) $1.00<f3/f4<2.49$ and (2) $1.00<|fw1\sim2/f2|<1.50$, where f2 is a focal length of the second lens group, f3 is a focal length of the third lens group, f4 is a focal length of the fourth lens group, and fw1~2 is a synthetic focal length of the first lens group and the second lens group at the wide-angle end.

11. An imaging apparatus comprising:
a zoom lens; and
an imaging device that converts an optical image formed by the zoom lens into an electric signal,
wherein the zoom lens includes a first lens group that has positive refracting power and is normally located at a fixed position, a second lens group that has negative refracting power and is movable in an optical axis direction for zooming, a third lens group that has positive refracting power and is normally located at a fixed position, and a fourth lens group that has positive refracting power and is movable in the optical axis direction for correction of a focal position due to the zooming and for focusing, arranged in order from an object side to an image side, wherein the zoom lens satisfies the conditional equations (1) and (2):

(1) $1.00<f3/f4<2.49$ and (2) $1.00<|fw1\sim2/f2|<1.50$, where f2 is a focal length of the second lens group, f3 is a focal length of the third lens group, f4 is a focal length of the fourth lens group, and fw1~2 is a synthetic focal length of the first lens group and the second lens group at the wide-angle end.

* * * * *